(12) United States Patent
Serizawa et al.

(10) Patent No.: US 8,275,937 B2
(45) Date of Patent: Sep. 25, 2012

(54) STORAGE SYSTEM AND PROCESSING EFFICIENCY IMPROVING METHOD OF STORAGE SYSTEM

(75) Inventors: Kazuyoshi Serizawa, Tama (JP); Akira Deguchi, Yokohama (JP); Norio Shimozono, Machida (JP)

(73) Assignee: Hitachi, Ltd., Tokyo (JP)

( * ) Notice: Subject to any disclaimer, the term of this patent is extended or adjusted under 35 U.S.C. 154(b) by 642 days.

(21) Appl. No.: 12/526,771

(22) PCT Filed: May 27, 2009

(86) PCT No.: PCT/JP2009/002337
§ 371 (c)(1),
(2), (4) Date: Aug. 11, 2009

(87) PCT Pub. No.: WO2010/137070
PCT Pub. Date: Dec. 2, 2010

(65) Prior Publication Data
US 2011/0153930 A1    Jun. 23, 2011

(51) Int. Cl.
*G06F 12/16*        (2006.01)

(52) U.S. Cl. .................. 711/114; 711/16; 711/E12.103
(58) Field of Classification Search .................. None
See application file for complete search history.

(56) References Cited

U.S. PATENT DOCUMENTS

| 6,378,039 B1 | 4/2002 | Obara et al. |
| 2005/0172097 A1 | 8/2005 | Voigt et al. |
| 2005/0198457 A1 | 9/2005 | Mizuno et al. |
| 2008/0263190 A1 | 10/2008 | Serizawa et al. |

FOREIGN PATENT DOCUMENTS

| EP | 2 015 168 A2 | 1/2009 |
| JP | 2008-269424 A | 11/2008 |

*Primary Examiner* — Kevin Verbrugge
(74) *Attorney, Agent, or Firm* — Foley & Lardner LLP

(57) ABSTRACT

A storage system 200 has a storage device 240 providing a plurality of logical volumes 250 used as data storage areas of a host 100 and a plurality of MPPKs 210 executing data IO processes for the logical volumes 250 from the host 100 and, when it is determined whether the MPPKs 210 correlated with the logical volumes 250 must be changed based on a storage function such as local copy set for the logical volumes 250, if it is determined that the change is necessary, the MPPK 210 after the change is determined such that the logical volumes 250 are correlated with the same MPPK 210.

15 Claims, 36 Drawing Sheets

[Fig. 1]
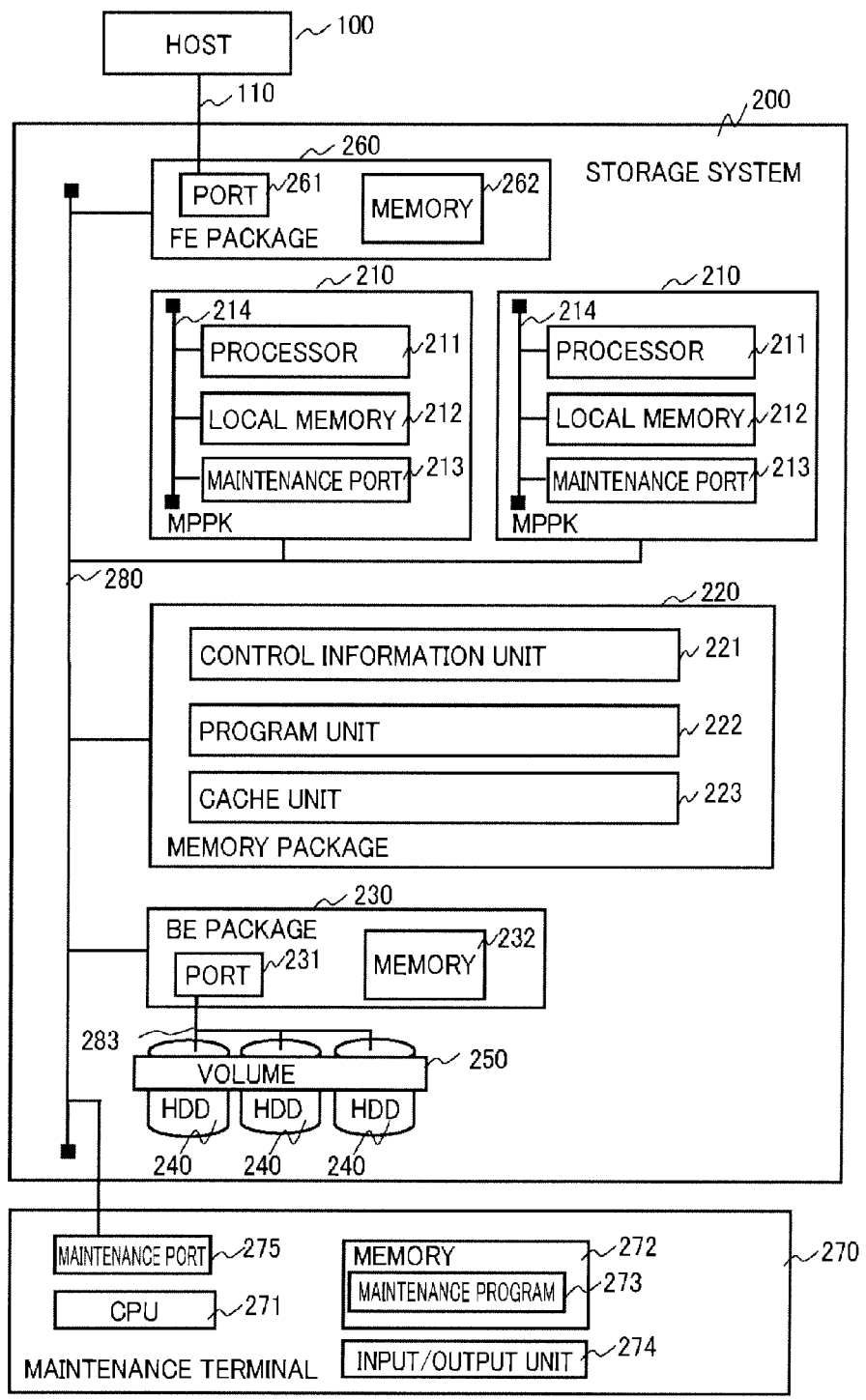

[Fig. 2]
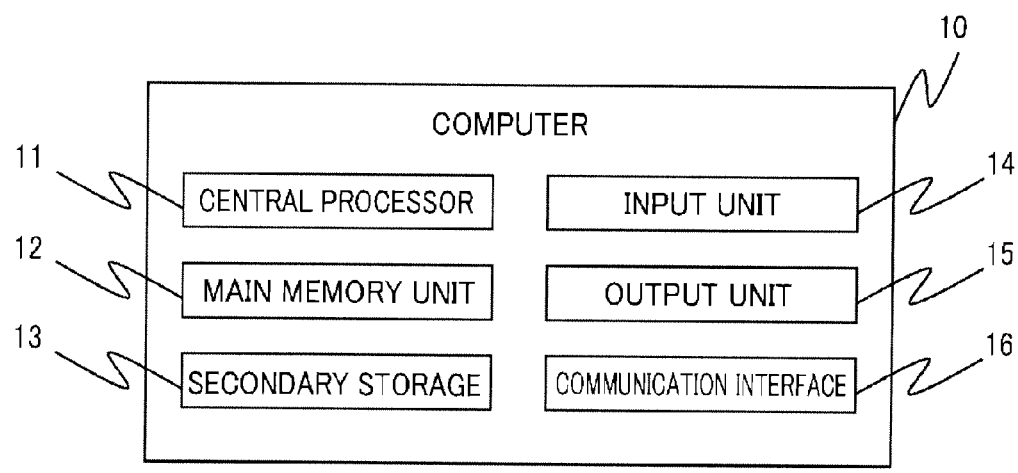

[Fig. 3]
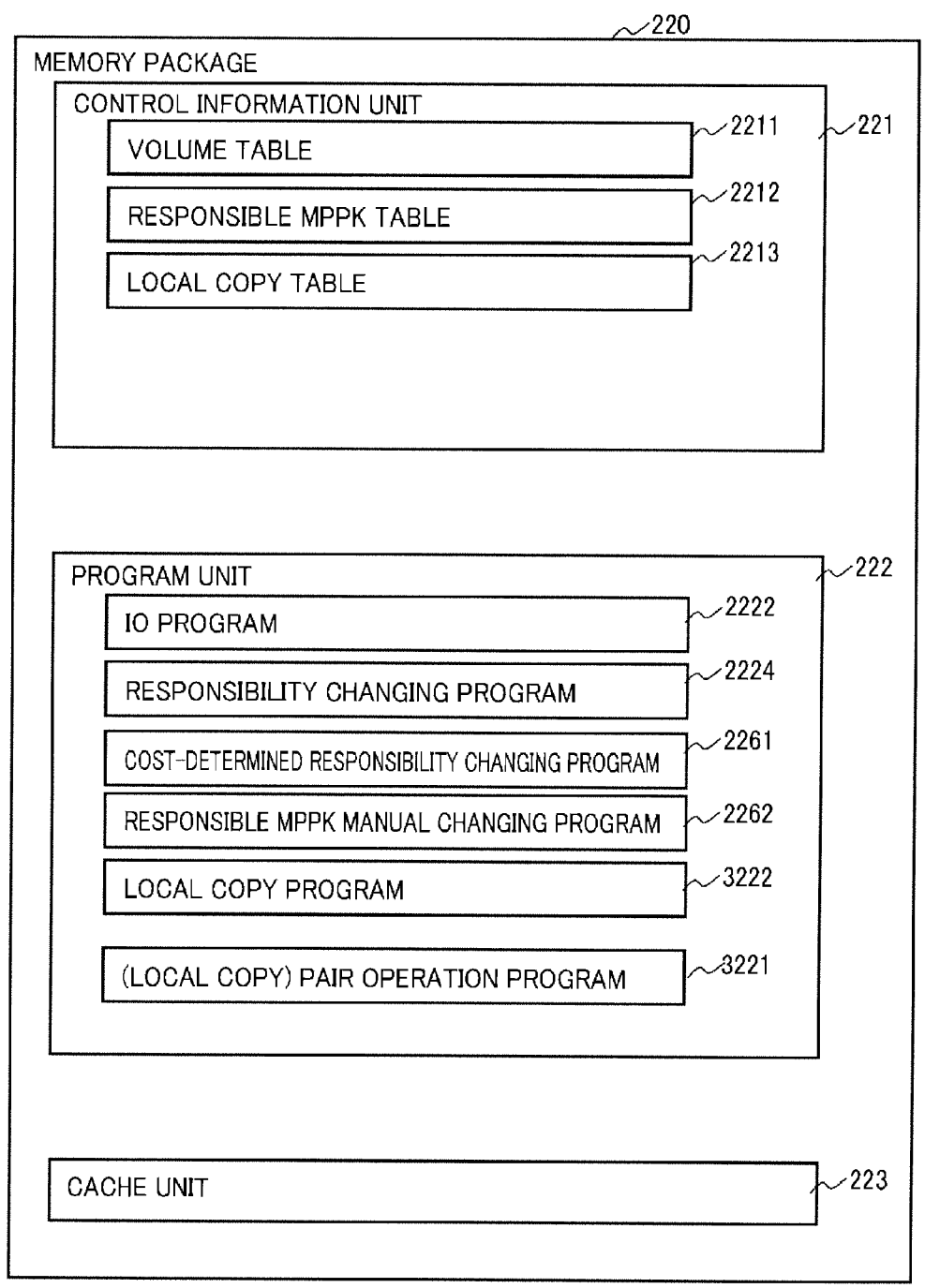

[Fig. 4]
VOLUME TABLE 2211
| VOLUME NUMBER | VOLUME ATTRIBUTE (FUNCTION BIT, PAIR NUMBER) |
|---|---|
| 1 | LOCAL COPY PVOL, 2 |
| 2 | LOCAL COPY SVOL, 1 |
| 3 | — |
| 4 | LOCAL COPY PVOL, 2 |
| 5 | REMOTE COPY TRANSFER DATA STORAGE VOL, 2 |
| | |
[Fig. 5]
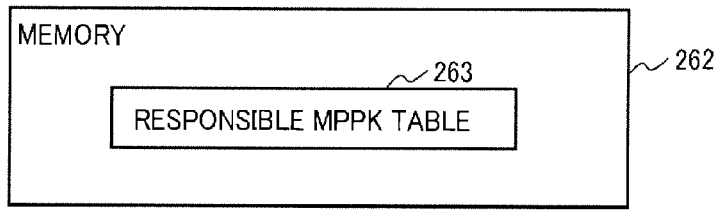
[Fig. 6]
RESPONSIBLE MPPK TABLE 263
| VOLUME NUMBER | RESPONSIBLE MPPK NUMBER |
|---|---|
| 1 | 1 |
| 2 | 2 |
| 3 | 3 |
| 4 | 4 |

[Fig. 7]

RESPONSIBLE MPPK TABLE 2212

| VOLUME NUMBER /22121 | RESPONSIBLE MPPK NUMBER /22122 |
|---|---|
| 1 | 1 |
| 2 | 1 |
| 3 | 1 |
| 4 | 3 |
| 5 | 2 |

[Fig. 8]

LOCAL COPY TABLE 2213
(EXAMPLE 1)

| PAIR NUMBER /22131 | PVOL NUMBER /22132 | SVOL NUMBER /22133 | PAIR STATE /22134 |
|---|---|---|---|
| 1 | 1 | 2 | SYNCHRONIZATION |
| 2 | 9 | 10 | SPLIT |
| 3 | 12 | 11 | SYNCHRONIZATION |
| 4 | 19 | 16 | SPLIT |
| 5 | 17 | 15 | SPLIT |
|  |  |  |  |

[Fig. 9]
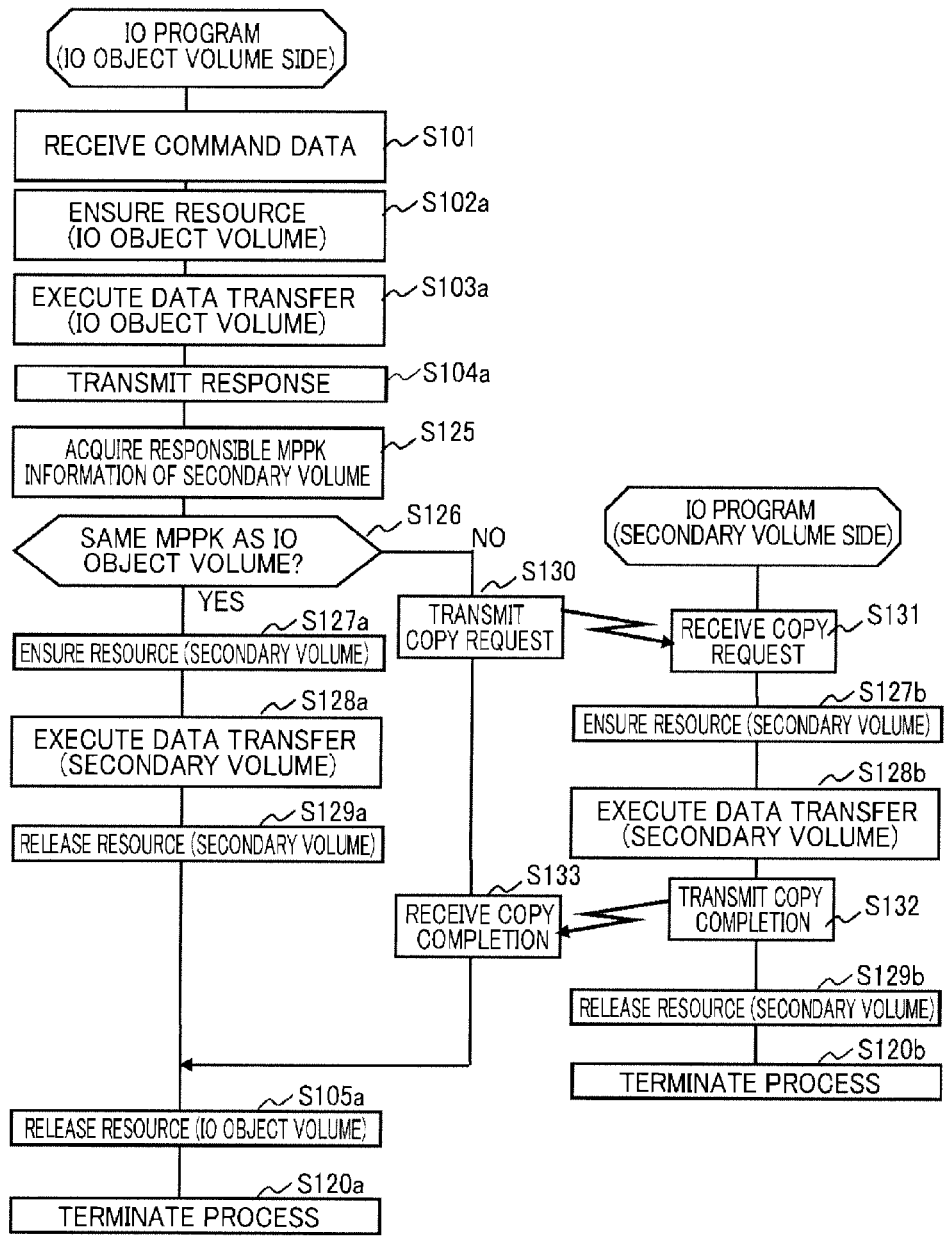

[Fig. 10]
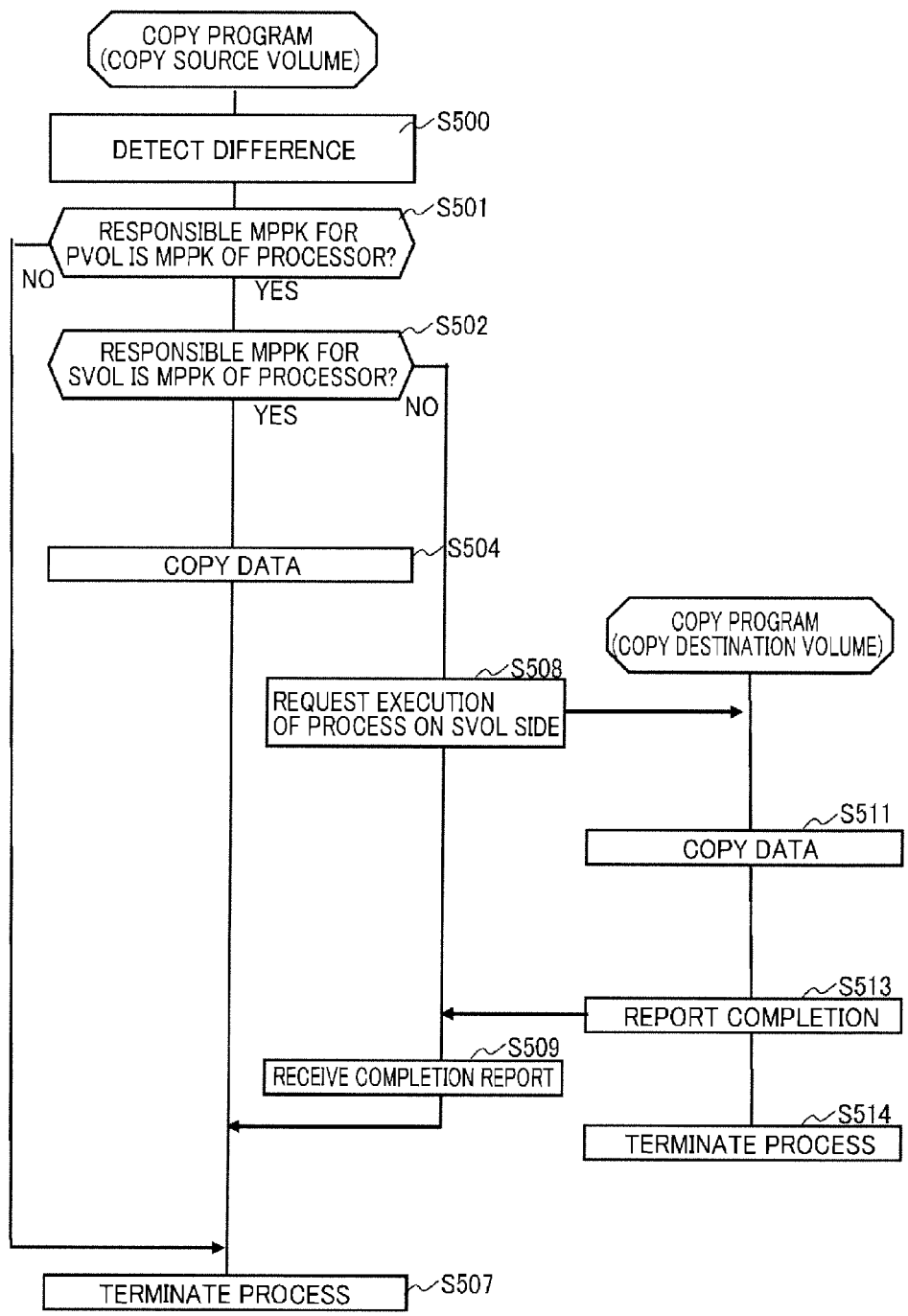

[Fig. 11]
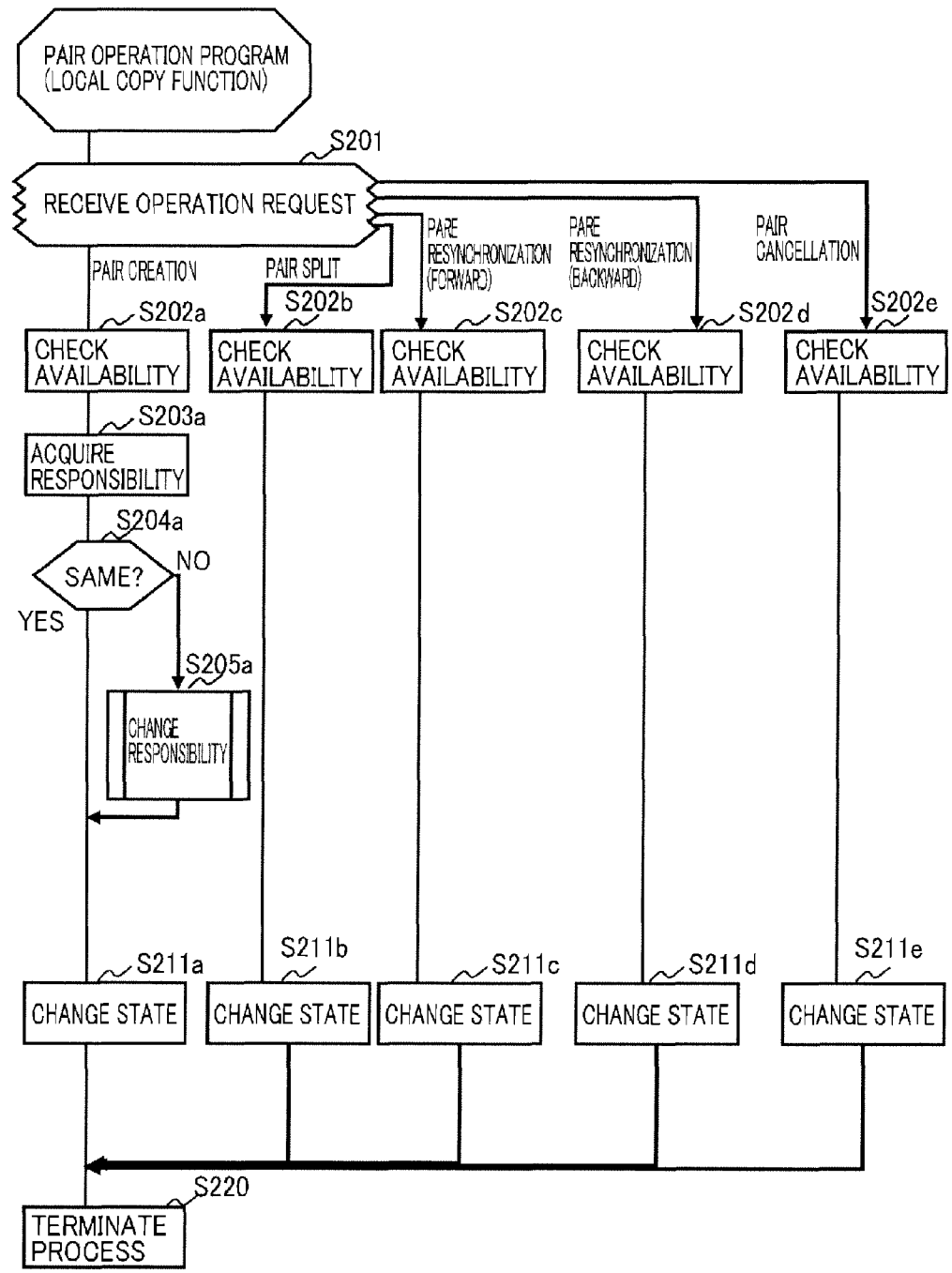

[Fig. 12]
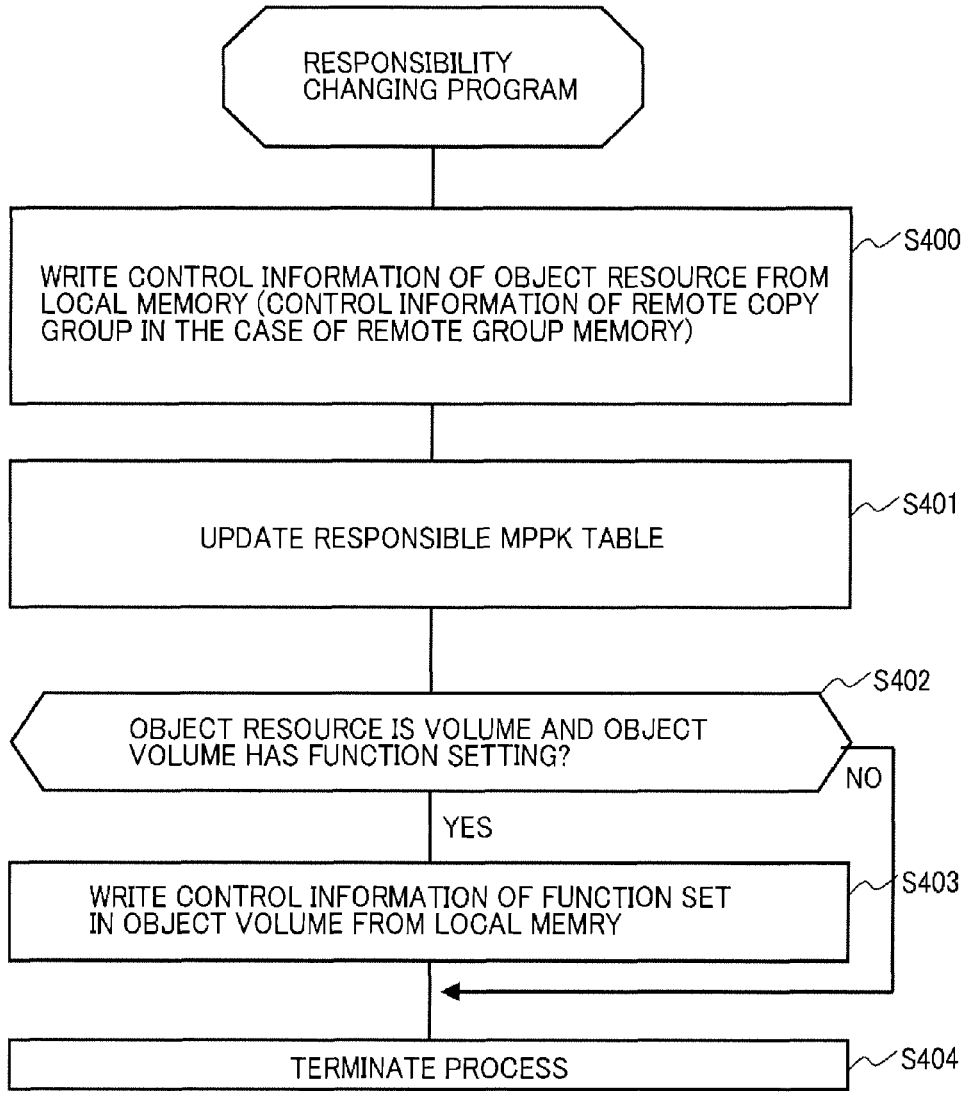

[Fig. 13]
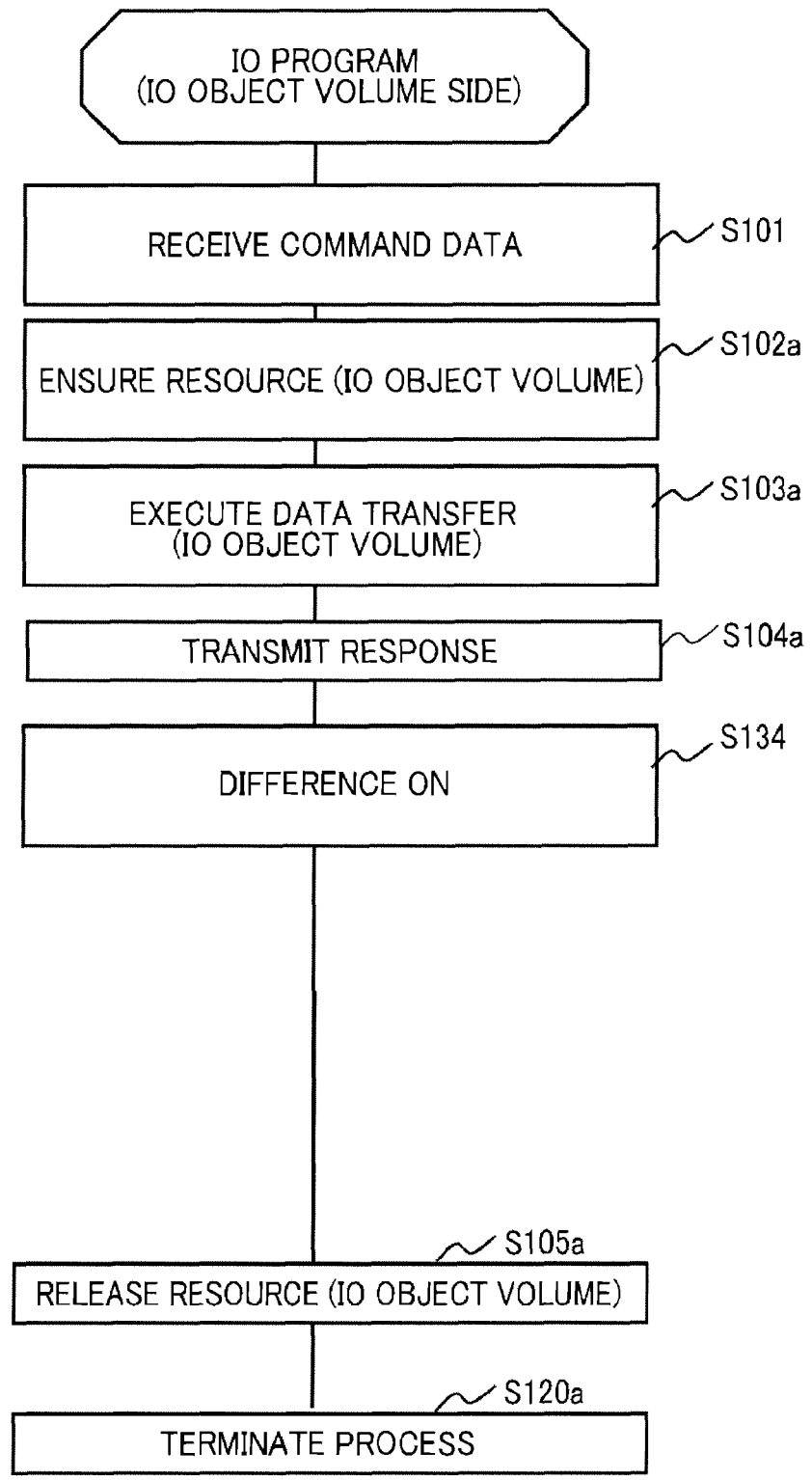

[Fig. 14]

RESPONSIBLE MPPK TABLE 2212
(EXAMPLE 2)

| VOLUME NUMBER ⁓22121 | RESPONSIBLE MPPK NUMBER ⁓22122 | MANUAL CHANGE AVAILABILITY ⁓22123 |
|---|---|---|
| 1 | 1 | OK |
| 2 | 1 | OK |
| 3 | 1 | NG |
| 4 | 3 | NG |
| 5 | 2 | OK |

[Fig. 15]
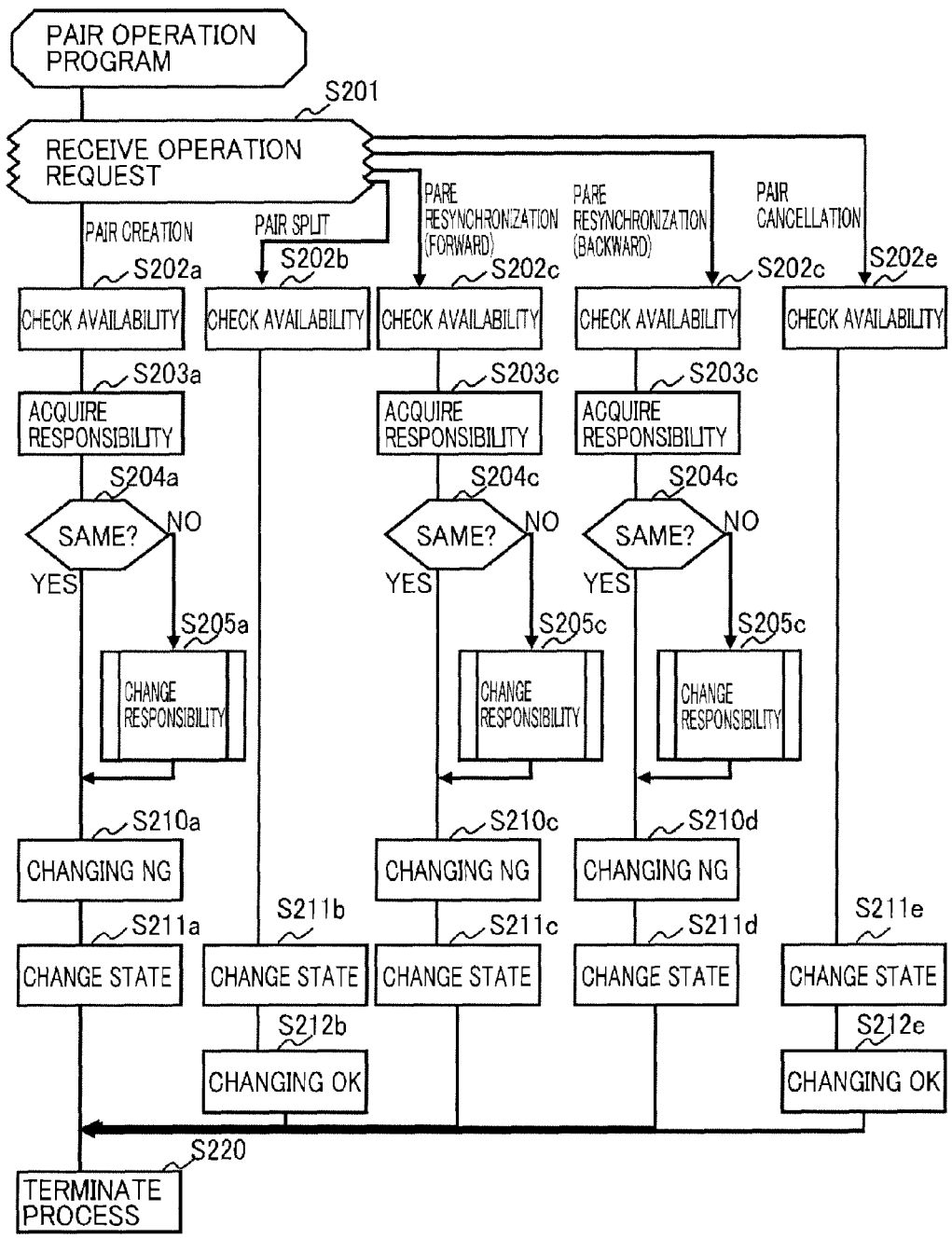

[Fig. 16]
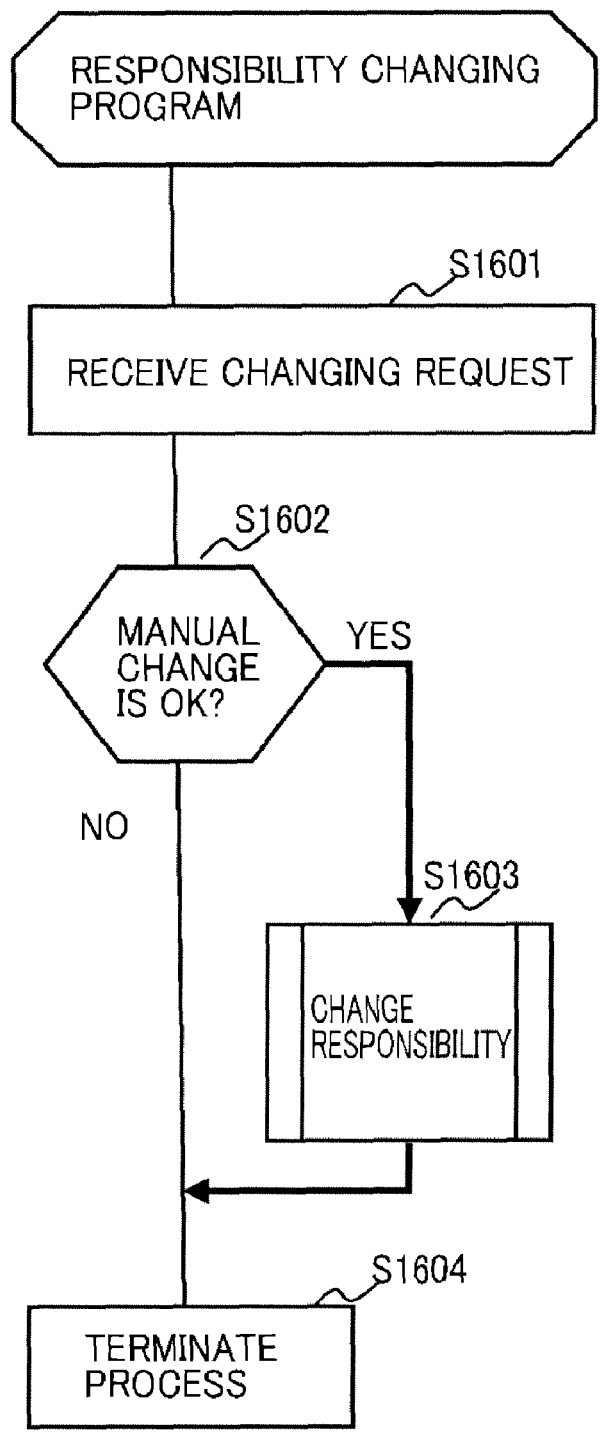

[Fig. 17]
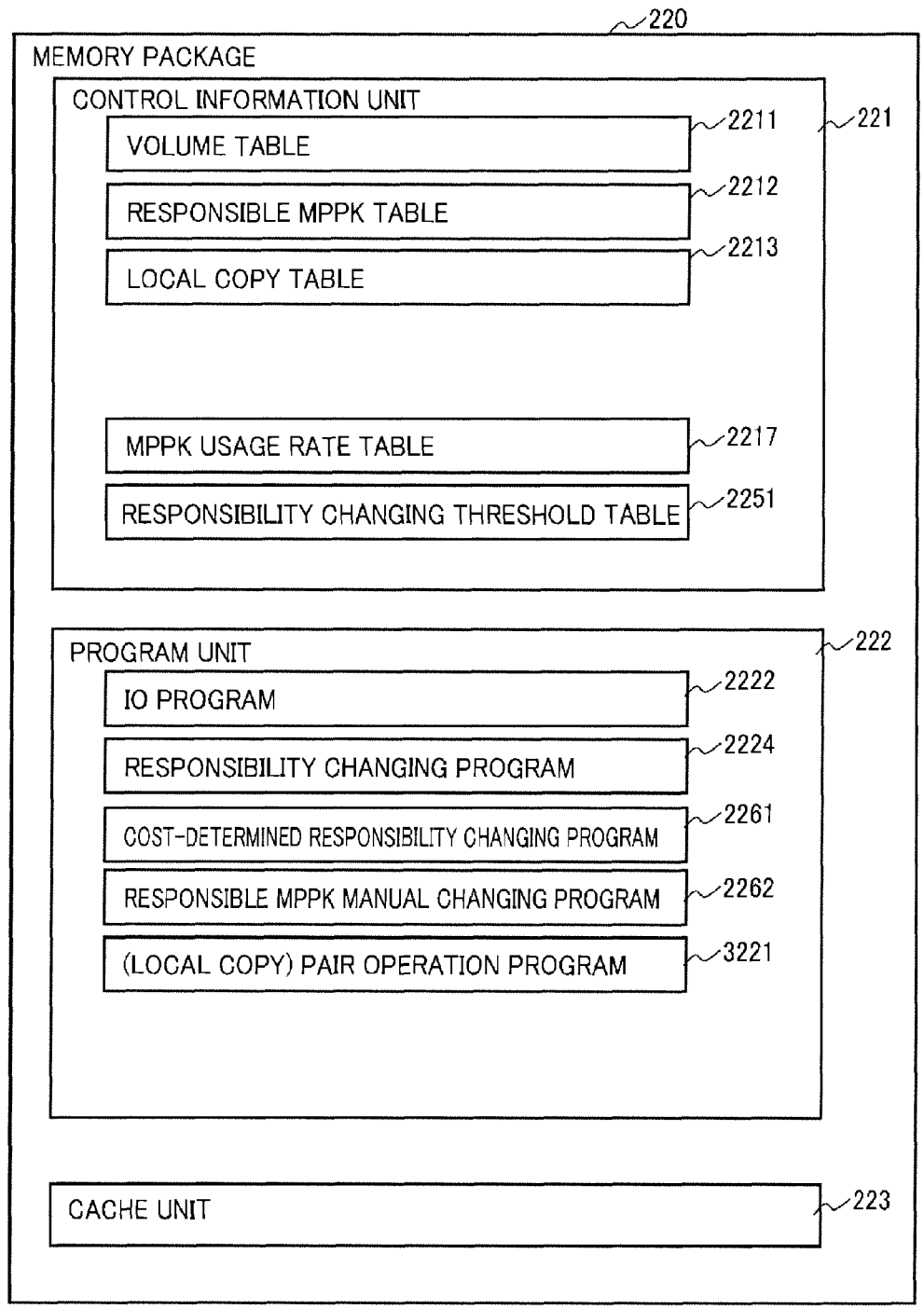

[Fig. 18]

MPPK USAGE RATE TABLE 2217

| MPPK NUMBER 22171 | USAGE RATE (%) 22172 |
|---|---|
| 1 | 50 |
| 2 | 60 |
| 3 | 20 |
| 4 | 80 |

[Fig. 19]

RESPONSIBILITY CHANGING THRESHOLD TABLE 2251

| FUNCTION TYPE 22511 | PVOL COST THRESHOLD VALUE 22512 |
|---|---|
| LOCAL COPY | 40% |
| REMOTE COPY | 30% |
| | |
| | |
| | |

[Fig. 20]
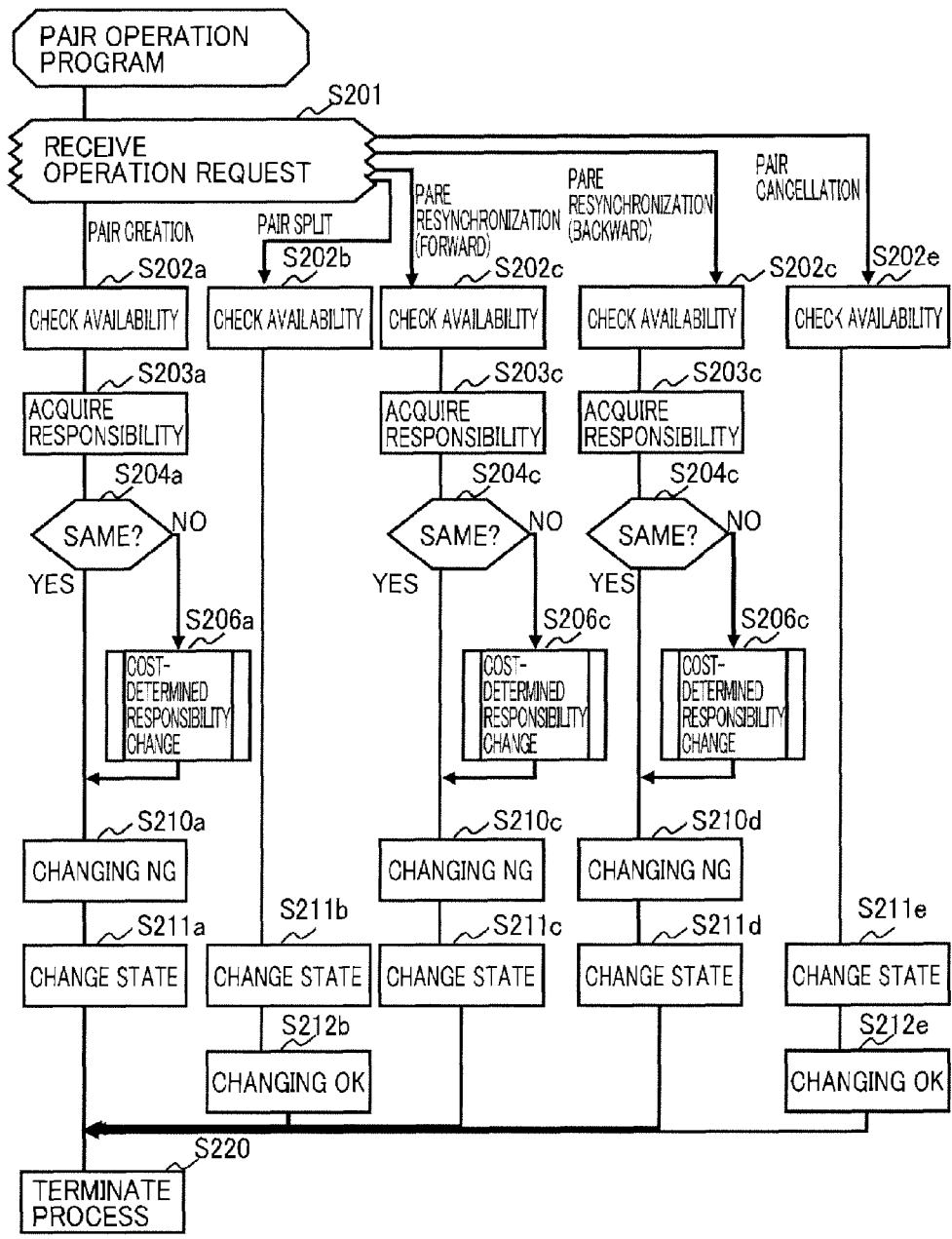

[Fig. 21]
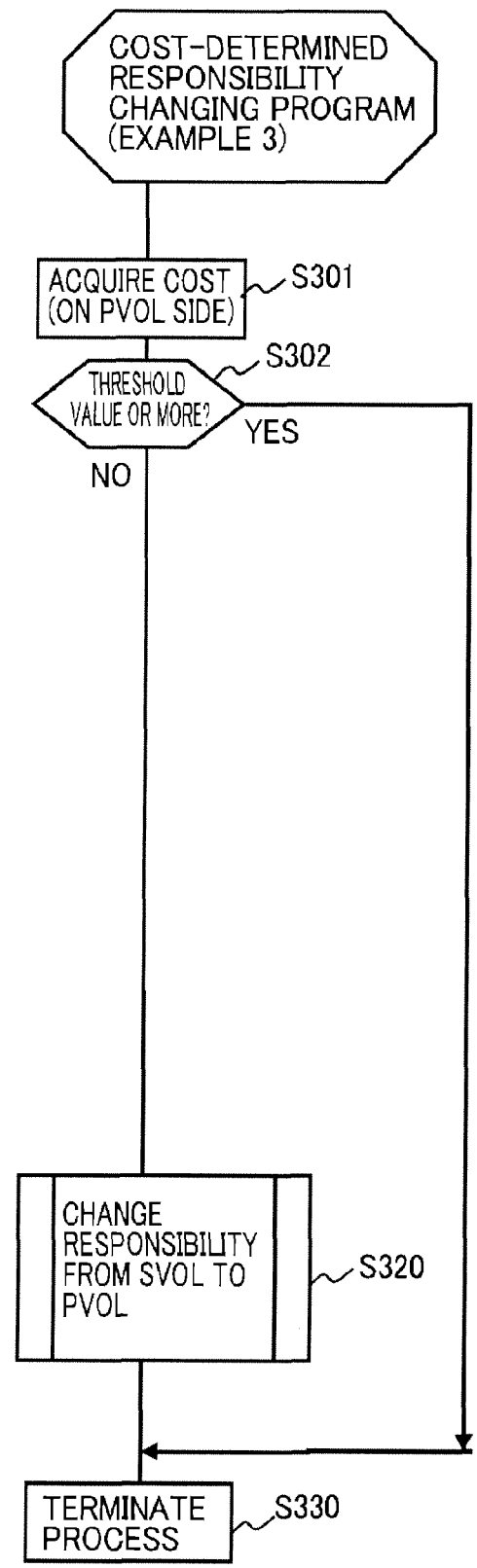

[Fig. 22]

RESPONSIBILITY CHANGING THRESHOLD TABLE 2251

| FUNCTION TYPE | PVOL COST THRESHOLD VALUE | SVOL COST THRESHOLD VALUE |
|---|---|---|
| LOCAL COPY | 40% | 60% |
| REMOTE COPY | 30% | 50% |
| | | |
| | | |
| | | |

[Fig. 23]
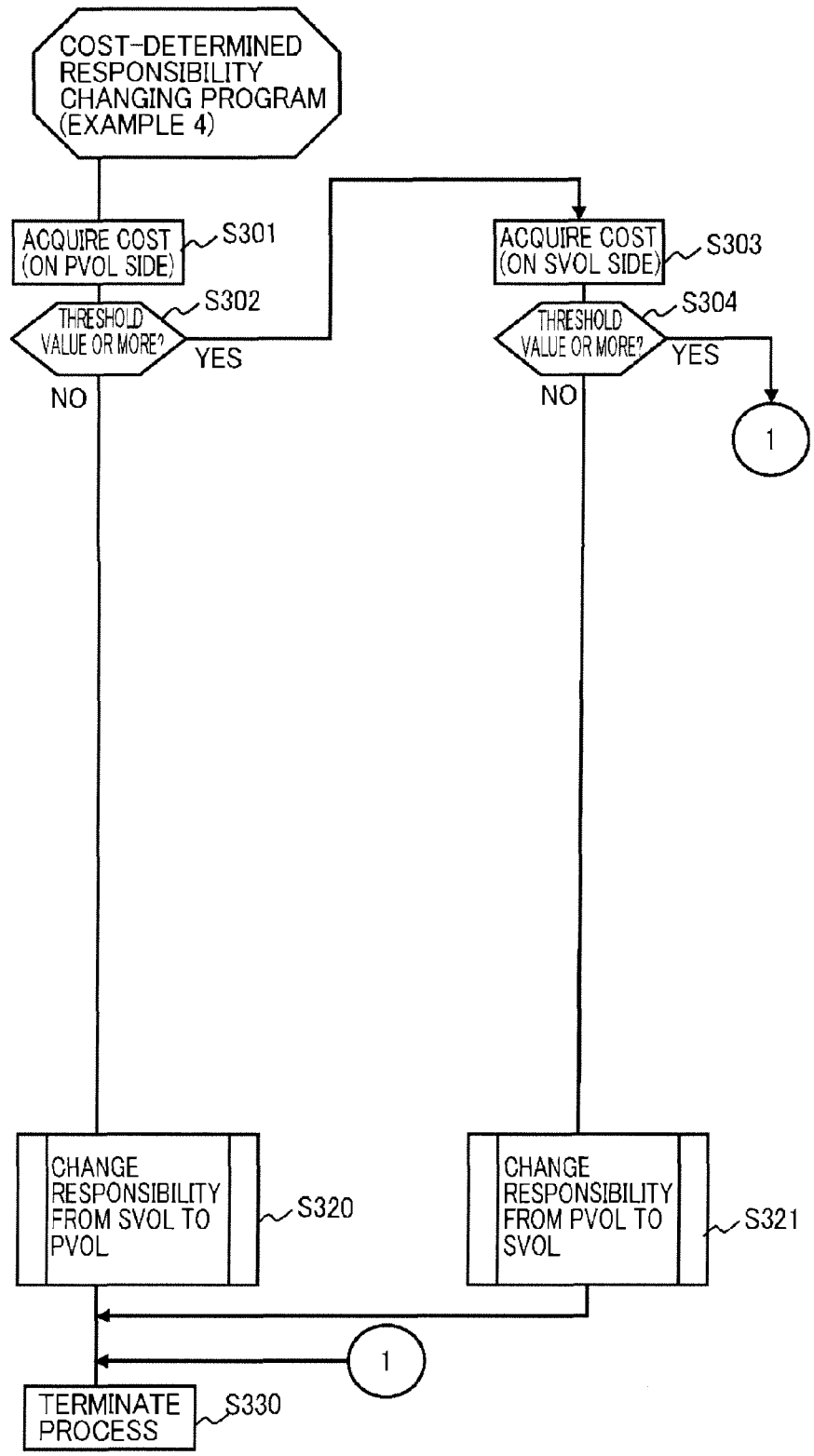

[Fig. 24]

LOCAL COPY TABLE 2213
(EXAMPLE 5)

| PAIR NUMBER /22131 | PVOL NUMBER /22132 | SVOL NUMBER /22133 | PAIR STATE /22134 | PVOL MOVABILITY /22135 |
|---|---|---|---|---|
| 1 | 1 | 2 | SYNCHRONIZATION | MOVABLE |
| 2 | 9 | 10 | SPLIT | NOT MOVABLE |
| 3 | 12 | 11 | SYNCHRONIZATION | MOVABLE |
| 4 | 19 | 16 | SPLIT | MOVABLE |
| 5 | 17 | 15 | SPLIT | NOT MOVABLE |
| | | | | |

[Fig. 25]
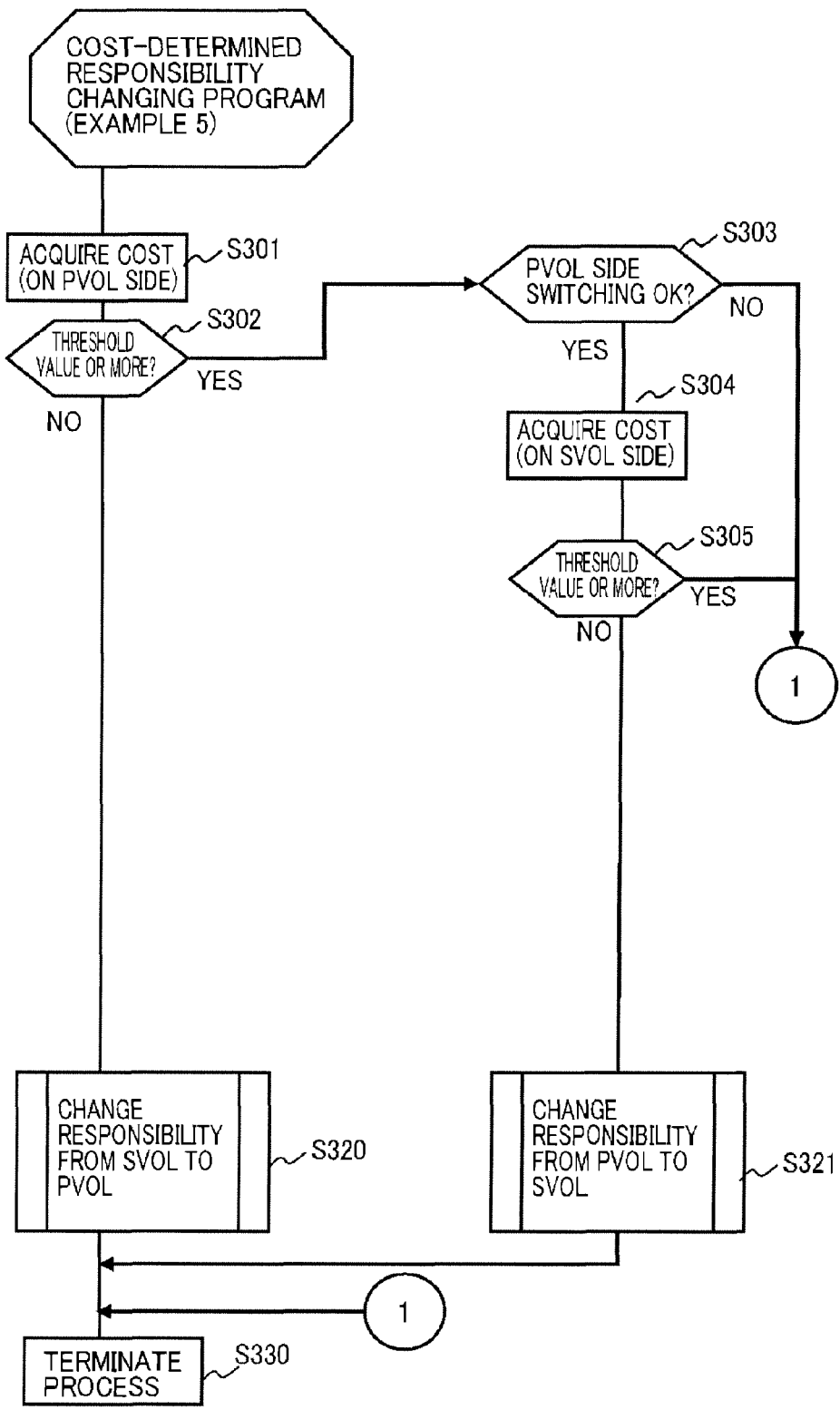

[Fig. 26]
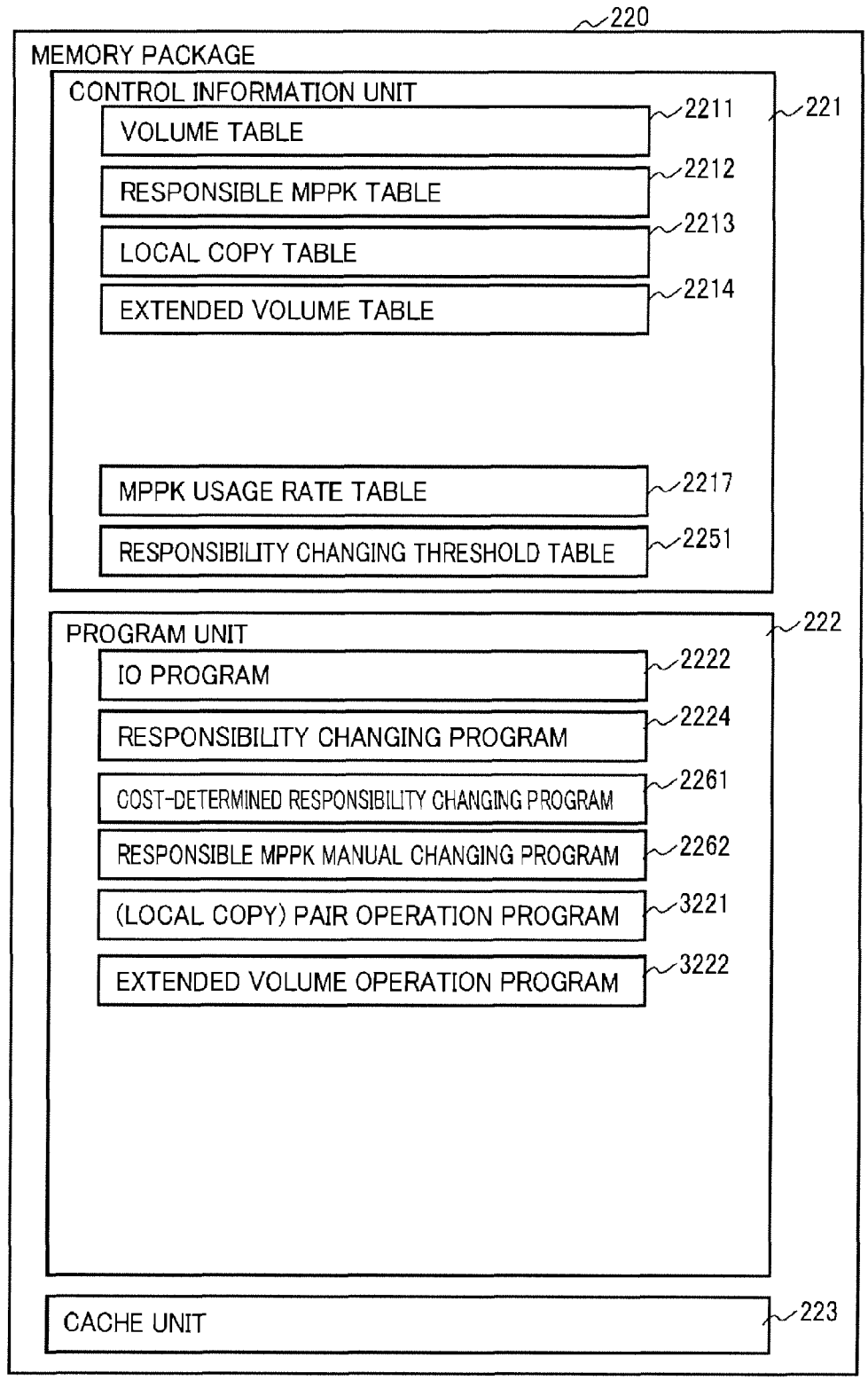

[Fig. 27]

EXTENDED VOLUME TABLE 2214

| EXTENDED VOLUME NUMBER /22141 | CONSTITUENT VOLUME NUMBER /22142 |
|---|---|
| 1 | 1、2、3 |
| 4 | 4、5、6、7 |
| 10 | 10、8、9 |
|  |  |

[Fig. 28]
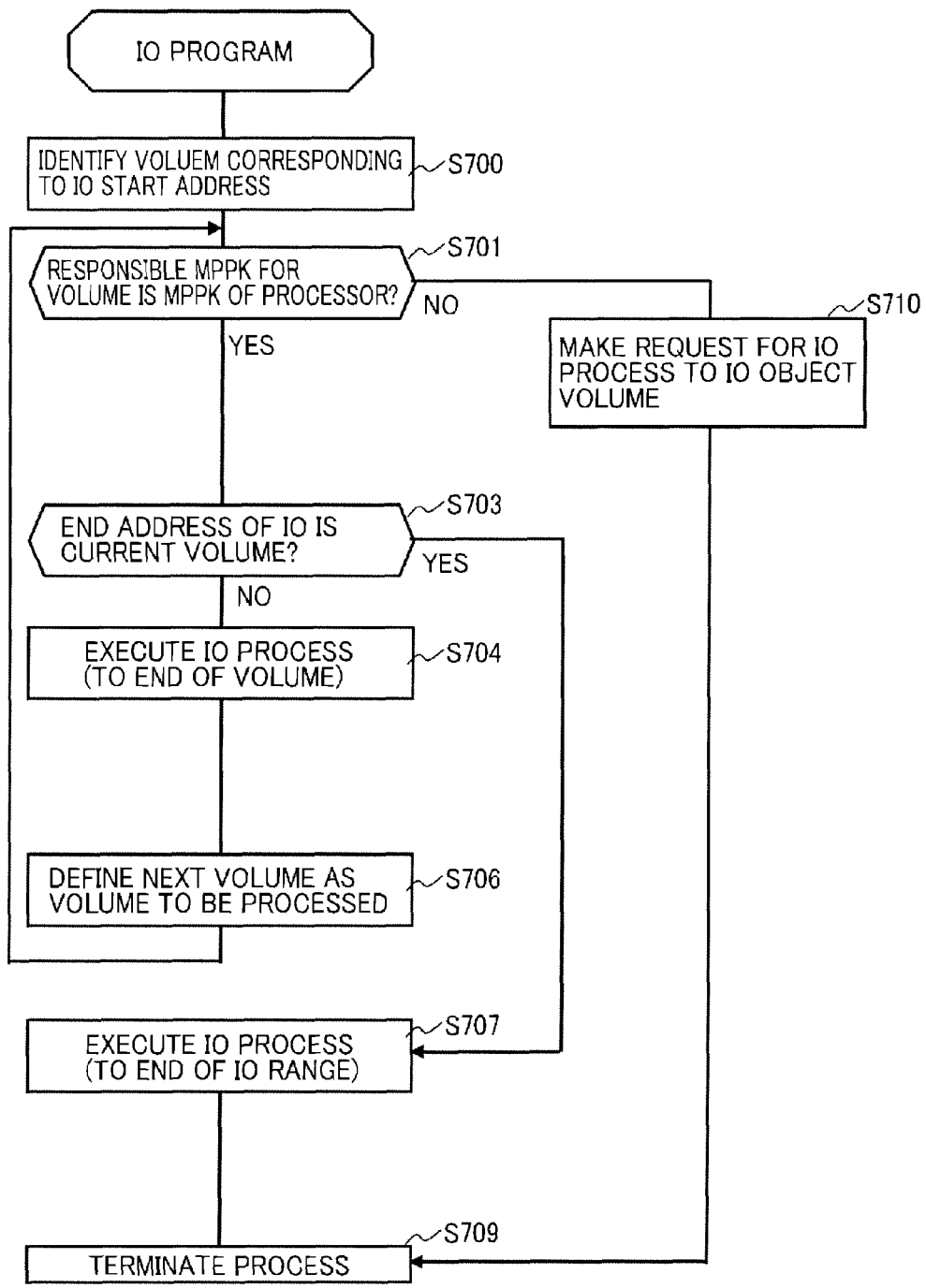

[Fig. 29]
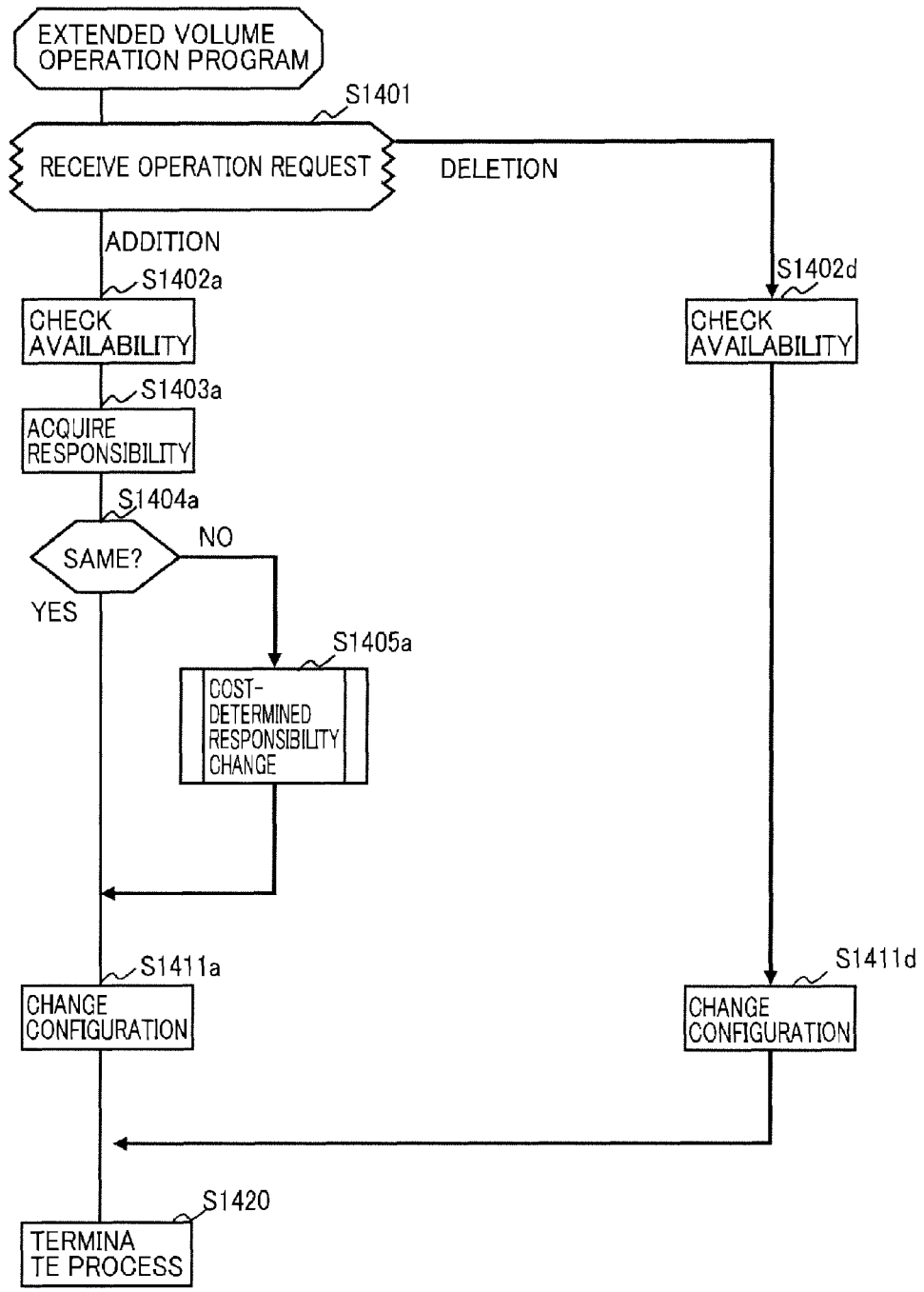

[Fig. 30]
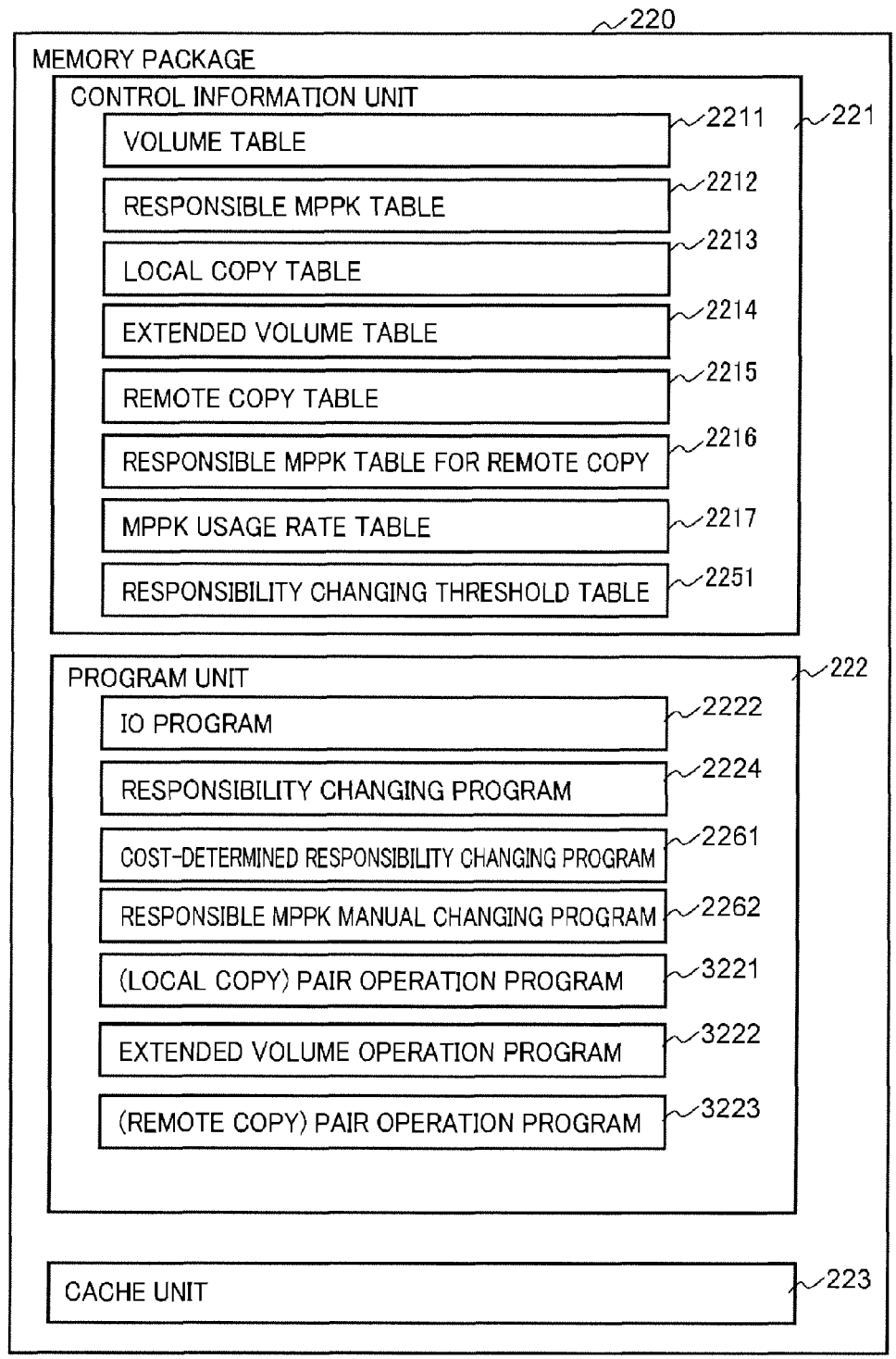

[Fig. 31]
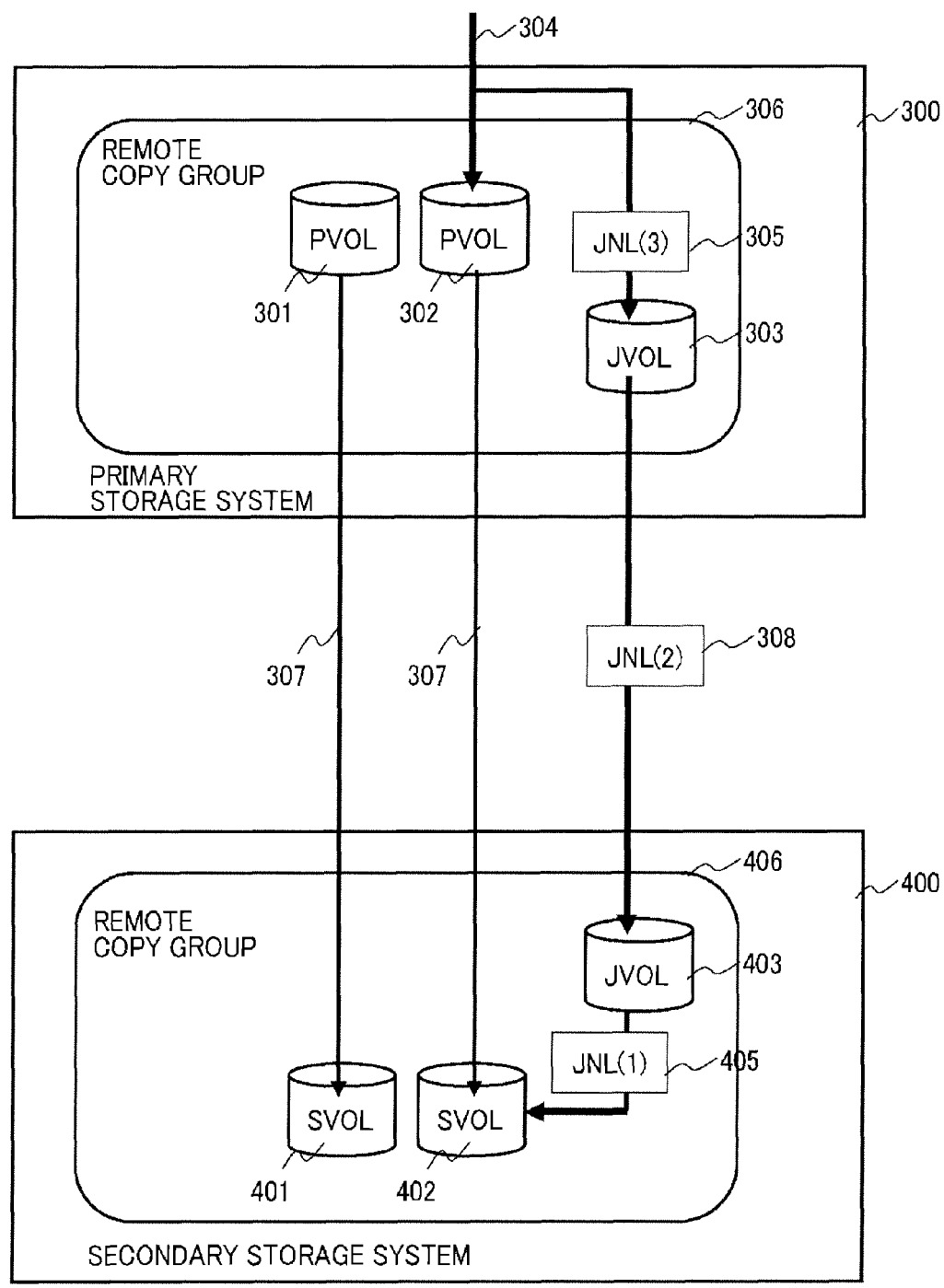

[Fig. 32]

REMOTE COPY TABLE 2215

| REMOTE COPY GROUP NUMBER | ATTRIBUTE | JVOL NUMBER | PVOL NUMBER | SVOL NUMBER | WRITE ORDER NUMBER |
|---|---|---|---|---|---|
| 1 | COPY SOURCE | 11, 12 | 1 | 20 | 100 |
| | | | 2 | 12 | |
| | | | 3 | 13 | |
| 2 | COPY SOURCE | 13, 14 | 4 | 34 | 1100 |
| | | | 5 | 16 | |
| | | | 6 | 18 | |
| | | | | | |

[Fig. 33]
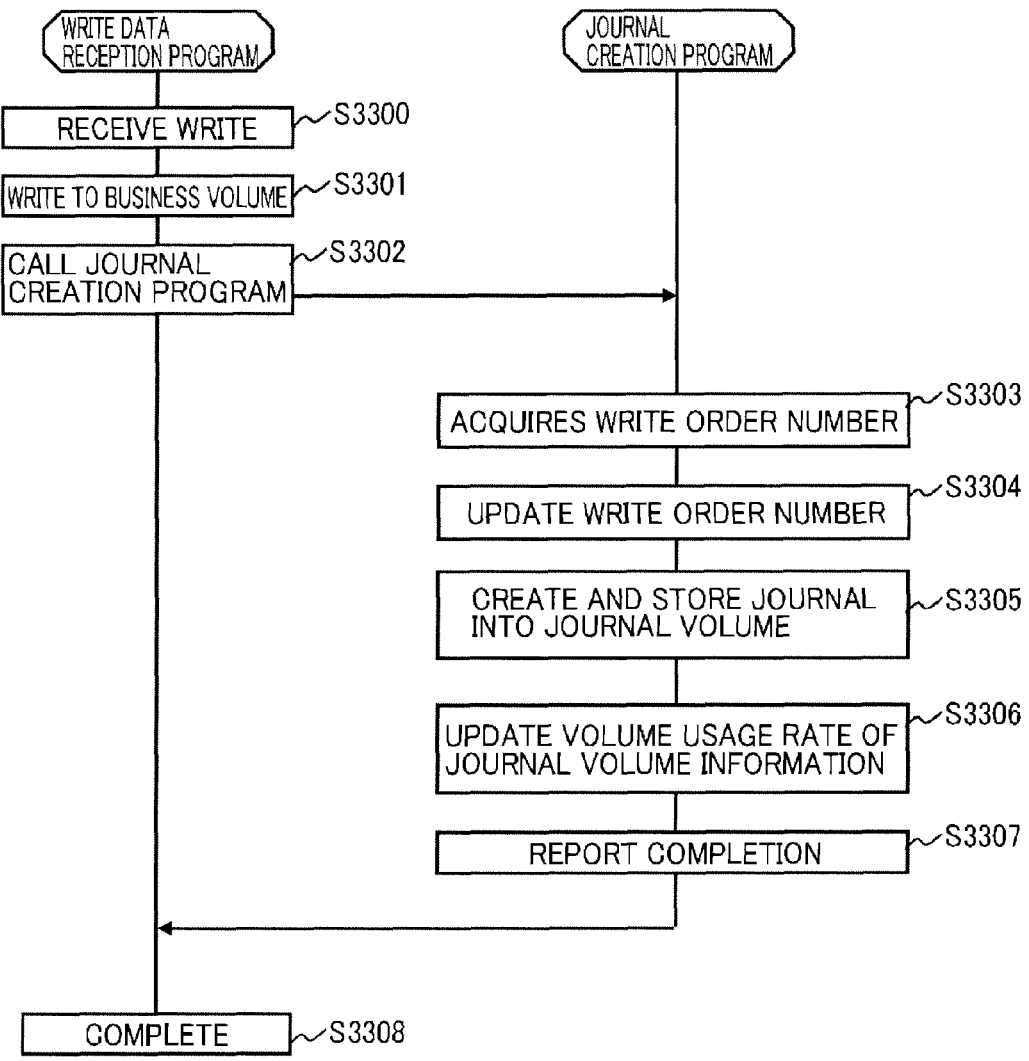

[Fig. 34]
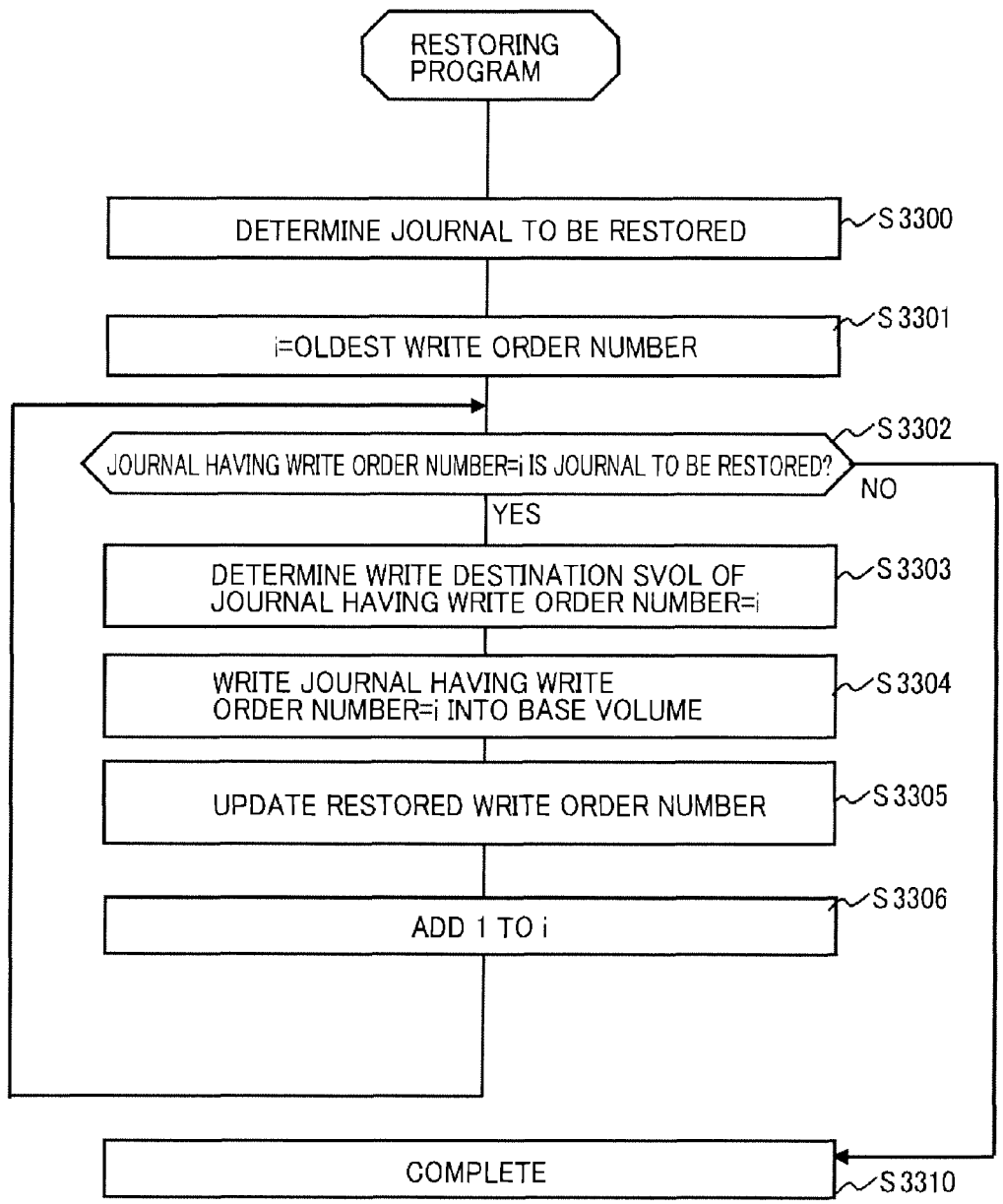

[Fig. 35]

RESPONSIBLE MPPK TABLE FOR REMOTE COPY GROUP 2216

| REMOTE COPY GROUP NUMBER ~22161 | RESPONSIBLE MPPK NUMBER ~22162 |
|---|---|
| 1 | 1 |
| 2 | 1 |
| 3 | 1 |
| 4 | 3 |
| 5 | 2 |

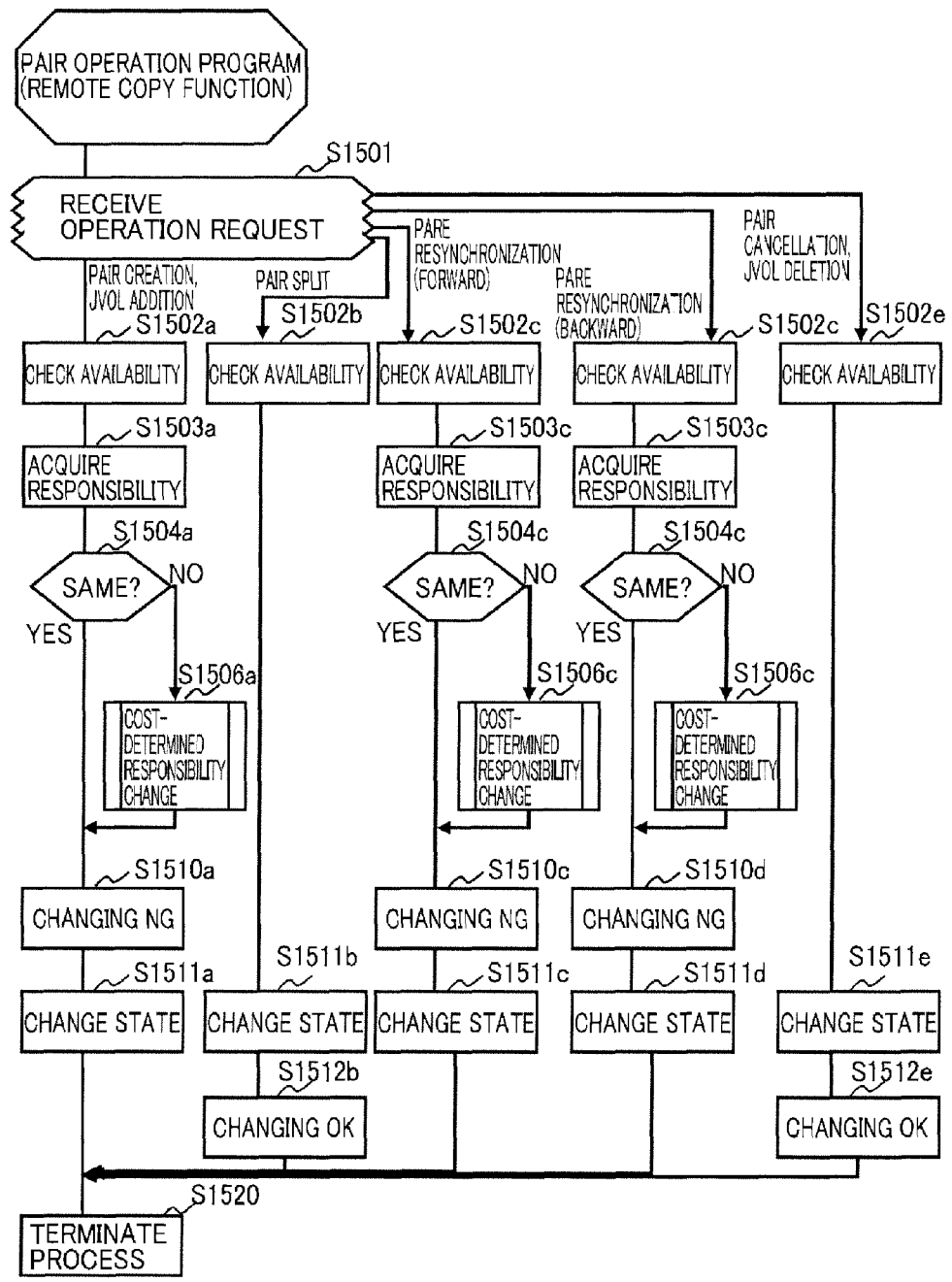
[Fig. 36]

[Fig. 37]
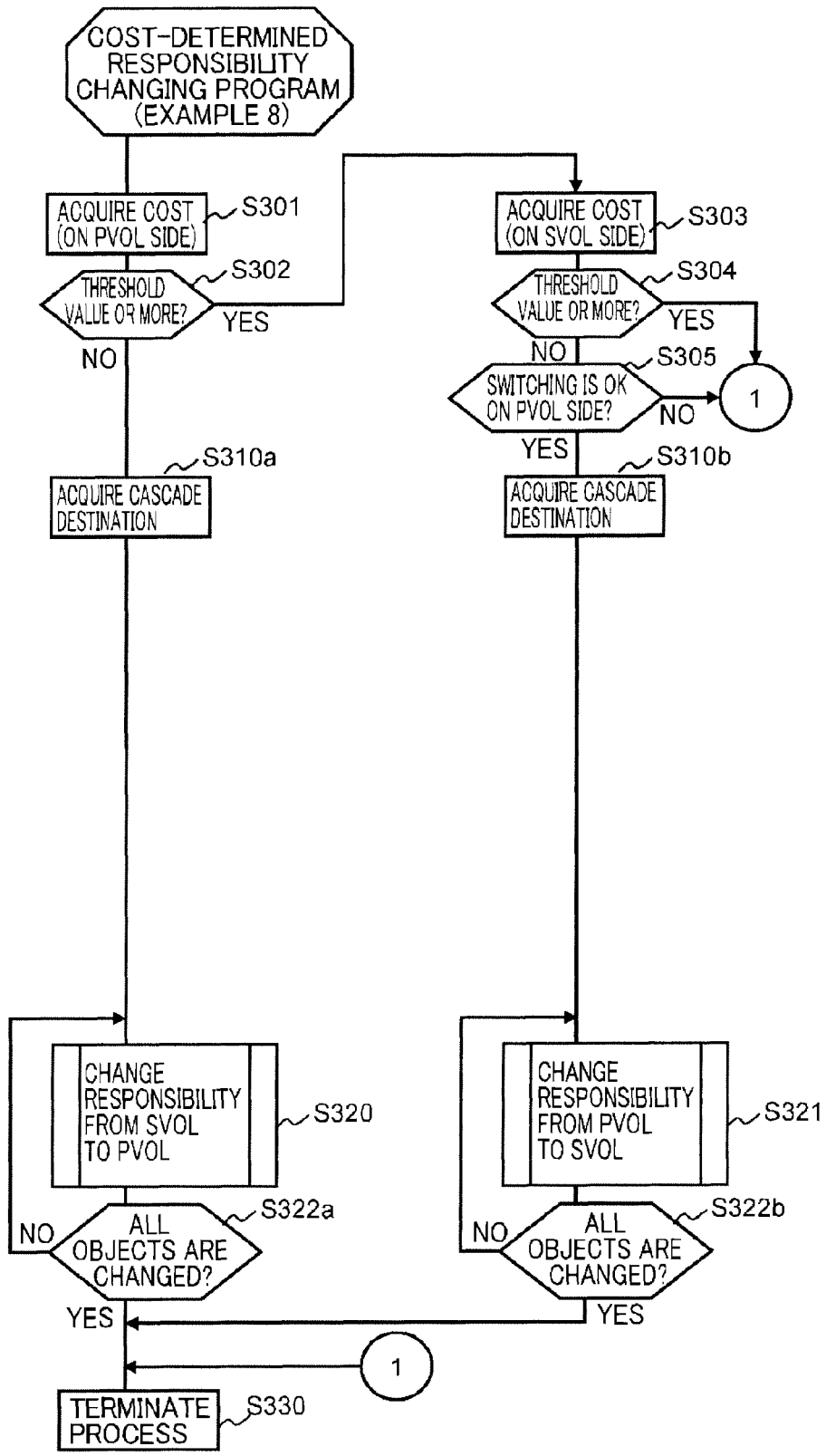

[Fig. 38]
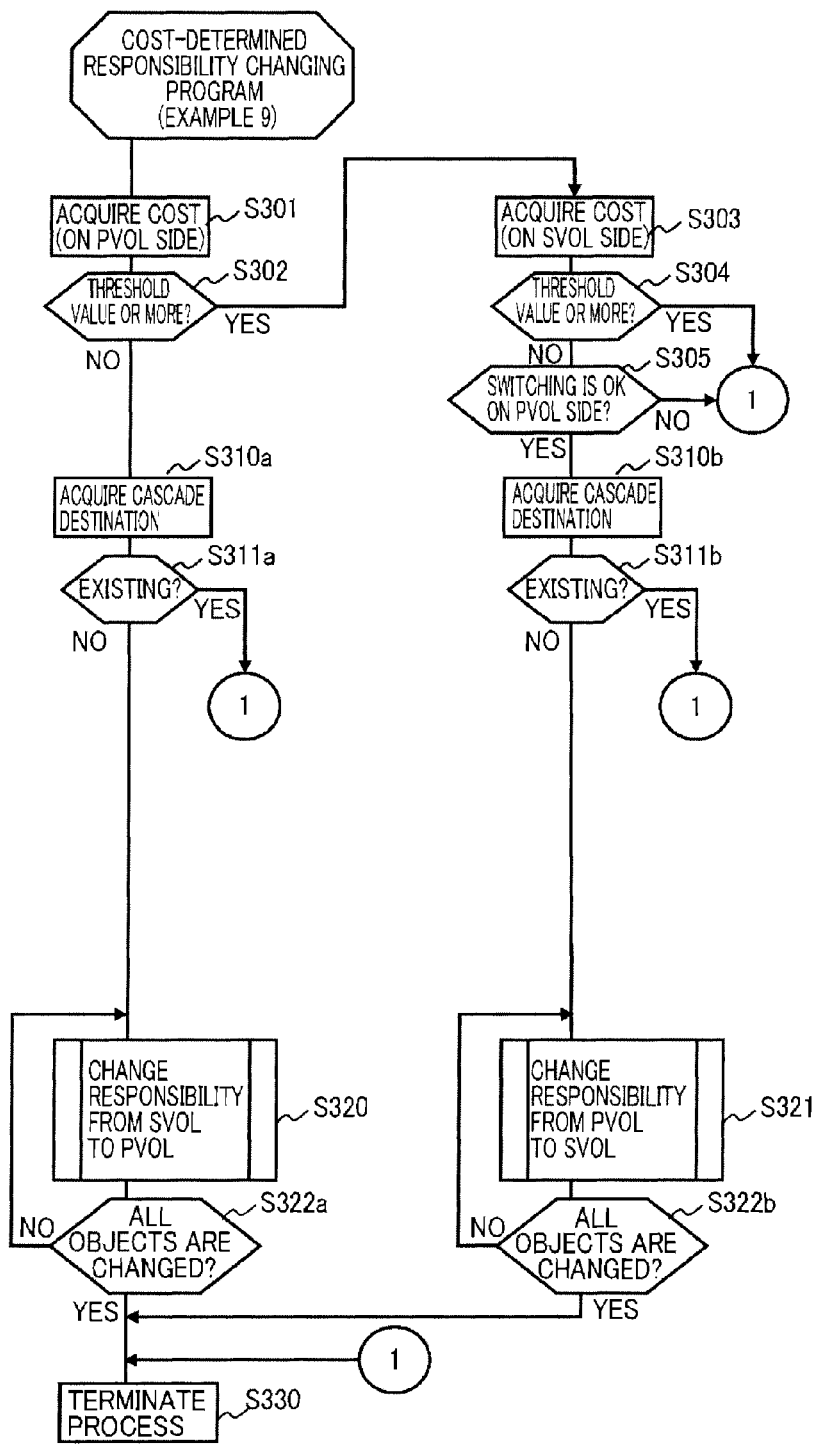

[Fig. 39]

RESPONSIBILITY CHANGING THRESHOLD TABLE 2251
(EXAMPLE 10)

| FUNCTION TYPE | PVOL COST THRESHOLD VALUE | SVOL COST THRESHOLD VALUE | MAXIMUM MOVED VOL NUMBER VALUE | WEIGHT |
|---|---|---|---|---|
| LOCAL COPY | 40% | 60% | 3 | 2 |
| REMOTE COPY | 30% | 50% | 2 | 5 |
| | | | | |
| | | | | |
| | | | | |

[Fig. 40]
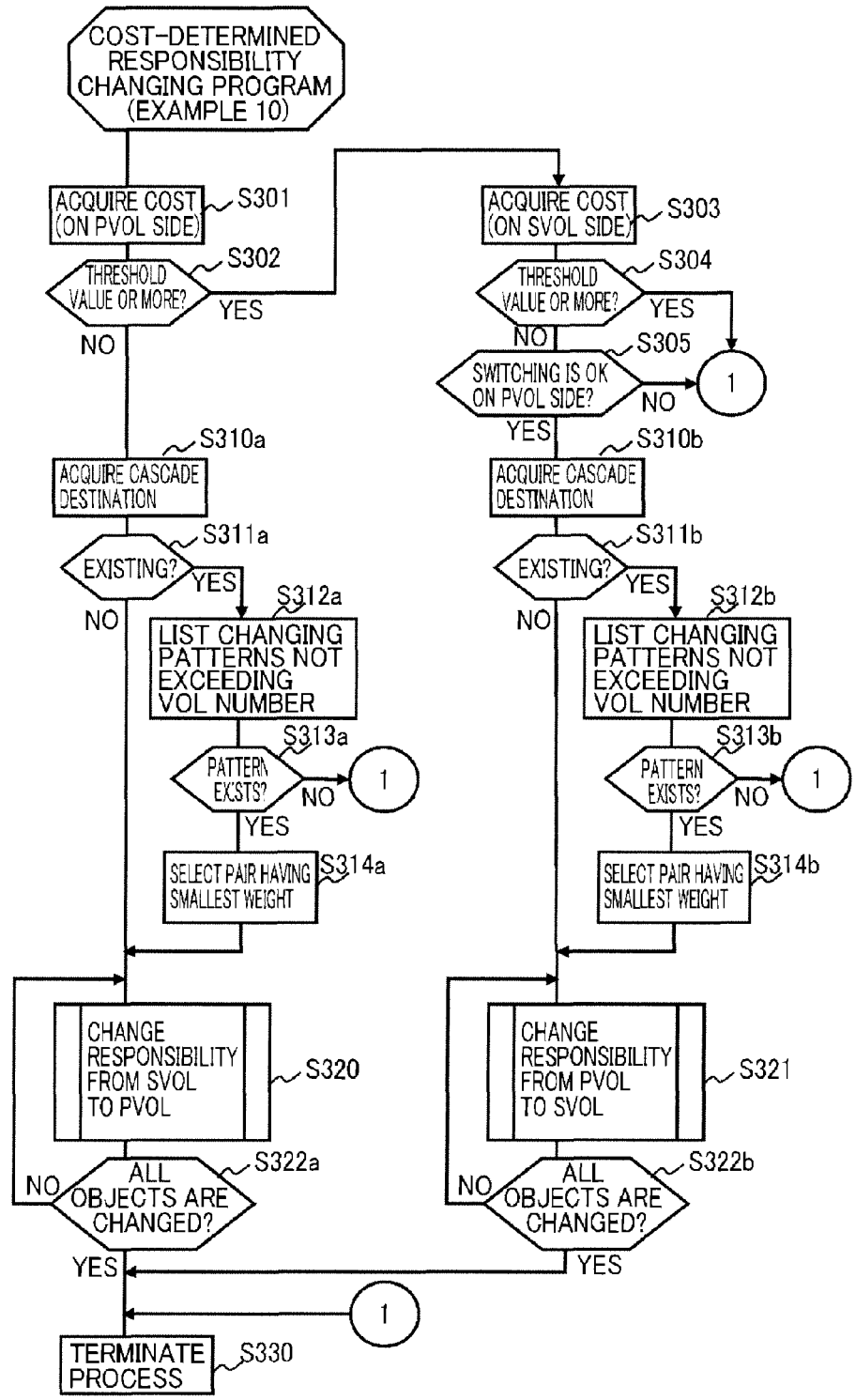

STORAGE SYSTEM AND PROCESSING EFFICIENCY IMPROVING METHOD OF STORAGE SYSTEM

TECHNICAL FIELD

The present invention relates to a storage system and a processing efficiency improving method of the storage system, and, more particularly, to a storage system and a processing efficiency improving method of the storage system capable of preventing increase in communication overhead of a processor executing input/output processes for a plurality of logical storage areas included in the storage system to improve the processing efficiency of the storage system.

BACKGROUND ART

Various organizations such as governments, companies, and colleges use a relatively large scale storage system to manage data since a large amount and variety of data are handled. This storage system is configured by arranging a multiplicity of storage devices (e.g., a hard disk drive (hereinafter, "HDD")) into an array and provides a storage area based on RAID (Redundant Array of Independent (or Inexpensive) Disks), for example. At least one logical volume (hereinafter, "volume") is formed on a physical storage area provided by a storage device group and this volume is provided to a host computer (hereinafter, "host"). The host transmits predetermined commands to the storage system to write/read data to/from the volume.

The above volume is a unit of the logical storage area provided by the storage device group, and a logical unit (LU) recognized as a unit logical storage area by the host is generated by setting a logical storage area created by one or a plurality of volume such that the logical storage area becomes identifiable from the host Conventionally, higher performance has been required for storage systems. PTL 1 discloses a technology related to higher performance of a storage system. Specifically, PTL 1 discloses a technology of preliminarily determining microprocessor packages (hereinafter, "MPPK") responsible for respective volumes in a control unit executing data processes (such as writing and reading of data) in the volumes to store control information necessary for the processes in local memories within the MPPK. PTL 1 also discloses a technology of changing MPPK responsible for a process of a certain volume to another MPPK.

CITATION LIST

Patent Literature
PTL 1: Japanese Patent Application Laid-Open Publication No. 2008-269424

SUMMARY OF INVENTION

Technical Problem

A storage system has various storage functions utilizing a plurality of volumes. For example, a volume copy function is included that copies data stored in one volume into another volume. The volume copy function is a process of correlating two volumes, i.e., a copy source and a copy destination, to copy data from the source volume to the destination volume and includes a remote copy process, for example.

On the other hand, to implement such storage functions, communications may be necessary among a plurality of MPPKs executing processes for the volumes. For example, it is assumed that a disk control unit of a storage system is provided with a first MPPK and a second MPPK responsible for processes of a first volume and a second volume, respectively, provided by the storage system. In this case, to implement a copy function between two volumes from the first volume where the first MPPK is responsible for IO processes to the second volume where the second MPPK is responsible for IO processes, when the host makes an input request to the first volume, the input data must be copied to the second volume and, therefore, a copy request of the input data are executed from the first MPPK to the second MPPK. This copy request process is not necessary if the same MPPK is responsible for the first volume and the second volume and, therefore, causes increase in overhead associated with communications, resulting in reduction in processing efficiency.

In conventional storage systems, MPPKs responsible for IO processes of volumes are not determined in consideration of the inter-MPPK communication processes generated to implement the above storage functions.

The present invention was conceived in view of the above problem and it is therefore one object of the present invention to provide a storage system and a processing efficiency improving method of the storage system capable of preventing increase in communication overhead of a processor executing input/output processes for a plurality of logical storage areas included in the storage system to improve the processing efficiency of the storage system.

Solution to Problem

One aspect of the present invention for achieving the above and other objects provides a storage system having a storage device that includes a storage medium providing a plurality of unit logical storage areas used as data storage areas of an external apparatus and a plurality of processing devices communicatively coupled to the storage device to execute data IO processes for the unit logical storage areas from the external apparatus, the system comprising a responsible processing device retaining unit that retains the unit logical storage areas and the processing devices executing the data IO processes of the unit logical storage areas in a correlated manner, a storage function retaining unit that retains the unit logical storage areas and storage function information that is information set for the unit logical storage areas to indicate usage aspects of the unit logical storage areas in a correlated manner, and a processing device changing unit that acquires from the responsible processing device retaining unit the processing device correlated with the logical storage areas based on the storage function set for the unit logical storage areas acquired from the storage function retaining unit for the unit logical storage areas to determine whether a change of the responsible processing device is necessary, the processing device changing unit changing the processing device correlated with the logical storage area to the different one of the processing devices if it is determined that the change is necessary.

ADVANTAGEOUS EFFECTS OF INVENTION

The present invention can provide a storage system and a processing efficiency improving method of the storage system capable of preventing increase in communication overhead of a processor executing input/output processes for a plurality of logical storage areas included in the storage system to improve the processing efficiency of the storage system.

BRIEF DESCRIPTION OF DRAWINGS

FIG. 1 is a diagram of an exemplary configuration of an information processing system 1 and a storage system 200.

FIG. 2 is a diagram of an exemplary configuration of a computer 10 usable as a host 100.

FIG. 3 is a diagram of an example of a control information unit, a program unit, and a cache unit stored in a memory package 220 of the storage system 200.

FIG. 4 is a diagram of an example of a volume table 2211.

FIG. 5 is a diagram of an example of control information stored in a memory 262.

FIG. 6 is a diagram of an example of a responsible MPPK table 263 stored in the memory 262.

FIG. 7 is a diagram of an example of a responsible MPPK table 2212 stored in a control information unit 221.

FIG. 8 is a diagram of an example of a local copy table 2213.

FIG. 9 is a diagram of an example of a process flow of an IO program in a local copy function.

FIG. 10 is a diagram of an example of a process flow of a copy program in a local copy function of example 1.

FIG. 11 is a diagram of an example of a process flow of a pair operation program in the local copy function of example 1.

FIG. 12 is a diagram of an example of a process flow of a responsibility changing program in the local copy function of example 1.

FIG. 13 is a diagram of an example of a process flow of an IO program in a variation of example 1.

FIG. 14 is a diagram of an example of the responsible MPPK table 2212 in example 2.

FIG. 15 is a diagram of an example of a process flow of a pair operation program 3221 in example 2.

FIG. 16 is a diagram of an example of a process flow of a responsible MPPK manual changing program 2262 in example 2.

FIG. 17 is a diagram of an exemplary configuration of a memory package 220 in example 3.

FIG. 18 is a diagram of an example of an MPPK usage rate table 2217 that manages a usage rate of an MPPK 210.

FIG. 19 is a diagram of an example of a responsibility changing threshold table 2251 in example 3.

FIG. 20 is a diagram of an example of a process flow of the pair operation program 3221 in example 3.

FIG. 21 is a diagram of an example of a process flow of a cost-determined responsibility changing program 2261 in example 3.

FIG. 22 is a diagram of an example of the responsibility changing threshold table 2251 in example 4.

FIG. 23 is a diagram of an example of a process flow of the cost-determined responsibility changing program 2261 in example 4.

FIG. 24 is a diagram of an example of the local copy table 2213 in example 5.

FIG. 25 is a diagram of an example of a process flow of the cost-determined responsibility changing program 2261 in example 5.

FIG. 26 is a diagram of an exemplary configuration of the memory package 220 in the storage system 200.

FIG. 27 is a diagram of an example of an extended volume table 2214.

FIG. 28 is a diagram of an example of a process flow of an IO program 2222 in an extended volume function.

FIG. 29 is a diagram of an example of a process flow of an extended volume operation program 3222.

FIG. 30 is a diagram of an exemplary configuration of the memory package 220 in the storage system 200.

FIG. 31 is a diagram of an example of a configuration implementing a remote copy function.

FIG. 32 is a diagram of an example of a remote copy table 2215

FIG. 33 is a diagram of an example of a journal creating process flow in the remote copy function.

FIG. 34 is a diagram of an example of a process flow of writing from JVOL to SVOL a journal transferred from PVOL in the remote copy function.

FIG. 35 is a diagram of an example of a responsible MPPK table for remote copy 2216.

FIG. 36 is a diagram of an example of a process flow of a pair operation program 3223 in the remote copy function in example 7.

FIG. 37 is a diagram of an example of a process flow of the cost-determined responsibility changing program 2261 in example 8.

FIG. 38 is a diagram of an example of a process flow of the cost-determined responsibility changing program 2261 in example 9.

FIG. 39 is a diagram of an example of the responsibility changing threshold table 2251 in example 10.

FIG. 40 is a diagram of an example of a process flow of the cost-determined responsibility changing program 2261 in example 10.

DESCRIPTION OF EMBODIMENTS

Preferred embodiments of the present invention will now be described in terms of the examples with reference to the accompanying drawings.

EXAMPLE 1

An information processing system 1 of example 1 of the present invention will be described with reference to FIGS. 1 to 13. FIG. 1 depicts an overall configuration of the information processing system 1 of this example.

System Configuration of Information Processing System 1

The information processing system 1 includes a host 100 and a storage system 200. The storage system 200 is an apparatus that includes a storage medium providing a storage area for storing data to be processed by the host 100 as described later. The host 100 and the storage system 200 are coupled through a network 110. For example, LAN (Local Area Network) is applicable to the network 110 and a network using another suitable protocol may also be employed.

Host 100

The host 100 is a computer running suitable OS (Operation System) such as UNIX (registered trademark) and is an apparatus that executes, for example, application software such as a database management system on the OS to perform predetermined business processes. Data used for the business processes executed by the host 100 is partially or entirely stored in a storage area provided by the storage system 200. The host 100 issues a read request and a write request to the storage system 200 with the use of the network 110 to write and read data stored in the storage system 200.

FIG. 2 depicts an exemplary configuration of a computer 10 usable as the host 100. The computer 10 includes a central processor 11 (e.g., CPU (Central Processing Unit) or MPU (Micro Processing Unit), hereinafter, for simplicity, "CPU"), a main memory unit 12 (e.g., RAM (Random Access Memory) or ROM (Read Only Memory)), a secondary storage 13 (e.g., HDD), an input unit 14 accepting operations and inputs from a user (e.g., keyboard and mouse), an output unit 15 (e.g., a liquid crystal monitor), and a communication interface 16 (e.g., NIC (Network Interface Card) and HBA (Host Bus Adapter)) that implements communication with another apparatus.

An application program stored in the secondary storage 13 is read onto the main memory unit 12 and executed by the central processor 11 to execute various business data processes in the host 100.

Maintenance Terminal 270

A maintenance terminal 270 will then be described. The maintenance terminal 270 is a terminal for monitoring an operation state of the storage system described later or for giving an operational instruction necessary for maintenance, for example, and is SVP (SerVice Processor), for example.

The maintenance terminal 270 includes a maintenance port 275, a CPU 271, a memory 272, and an input/output unit 274 as shown in FIG. 1 and these units are communicatively coupled to each other through an internal network. The maintenance port 275 is coupled to a maintenance port 213 located in an MPPK 210 of the storage system 200 described later and is a port used for acquiring operation information from the MPPK 210 or transmitting a maintenance operation instruction to the MPPK 210.

The memory 272 stores a maintenance program 273 for executing processes related to the MPPK 210 and the CPU 271 reads and executes the maintenance program 273 from the memory 272 to implement the maintenance associated with the MPPK 210. The memory 272 is also used for storing information acquired from the MPPK 210.

The input/output unit 274 includes an input unit such as keyboard and mouse for accepting operations and inputs from a user and an output unit such as a display device for displaying to a user the operation information of the storage system 200 acquired from the MPPK 210. The maintenance terminal 270 is coupled to the maintenance port 213 of the MPPK 210 through an internal network 280 of the storage system 200.

Storage System 200

The configuration of the storage system 200 of this example will then be described with reference to FIG. 1. The storage system 200 of this example mainly includes a front-end package 260 (hereinafter, "FE package"), a microprocessor package 210 (MPPK), a memory package 220, a backend package 230 (hereinafter, "BE package"), and disk devices 240 and these units are communicatively coupled to each other through the internal network 280.

The storage system 200 may be configured to include pluralities of the FE packages 260, the memory packages 220, the BE packages 230, and the disk devices 240 and the three or more MPPKs 210.

The FE package 260 has a communication port 261 and a memory 262. The communication port 261 is coupled to a port (the communication interface 16 in an example of FIG. 8) used for the host 100 issuing IO requests to the storage system 200 and may accept a write request and a read request from the host 100. The port of the host 100 and the port 261 may be coupled directly through the network 110 or may be coupled indirectly through one or more switches, etc.

The memory 262 is made up of RAM, for example, and temporarily stores read and write requests received from the host 100, the information of the MPPK 210 processing the requests (the MPPK responsible for data processes related to the requested volume), the data transferred from the host 100, and the data to be transferred to the host 100. The FE package 260 may include pluralities of the ports 261 and the memories 262.

The MPPK 210 includes a processor 211, a local memory 212 and the maintenance port 213, which are communicatively coupled to each other through a network 214. The one MPPK 210 may include pluralities of the processors 211, the local memories 212 and the maintenance ports 213. A dual core processor or a quad core processor may be employed as the MPPK 210 and, in this case, the cores mounted in the processor packages correspond to the processors 211.

The processor 211 is a device that reads and executes a program stored in a program unit 222 of the memory package 220 described later to execute a process such as write and read requests from the host 100.

The local memory 212 is made up of RAM, for example, and is used as a cache memory for storing temporal data of the program executed by the processor 211 and storing data (such as control information described later, business data, and programs) stored in the HDD 240 and the memory 220. Since the local memory 212 is closer to the processor 211 than the memory package 220 and the disk devices 240, the processor 211 can access the local memory 212 at higher speed.

The maintenance port 213 is coupled to the maintenance port 275 of the maintenance terminal 270 through the network 280. The maintenance port 213 is a communication port used for transmitting the operation information of the MPPK 210 to the maintenance terminal 270 or accepting a maintenance operation instruction from the maintenance terminal 270.

The memory package 220 has a control information unit 221, the program unit 222, and a cache unit 223. The program unit 222 records programs for implementing a process with the storage system 200. The control information unit 221 records the control information utilized by the programs of the program unit 222 in table format, for example. The programs stored in the memory package 220 and the control information utilized by the programs are read from the memory package 220 and processed by the processor 211 of the MPPK 210. Details of the programs recorded in the program unit 222 and the control information recorded in the control information unit 221 will be described later.

The cache unit 223 temporarily stores data to be stored in the HDDs 240 and data read from the disk devices 240. Since the memory package 220 is made up of RAM, etc., i.e., the storage medium faster than the disc devices 24, the processes such as read and write requests from the host 100 can be accelerated by storing into the cache unit 223 the frequently used data, etc., stored in the disk devices 240 as compared to the case of always accessing the disk devices 240 for all the data IO. The memory package 220 may be multiplexed so as to avoid the data loss at the time of the occurrence of failure.

The BE packages 230 has a port 231 and a memory 232. The port 231 is coupled to the disk devices 240 through a network 283 and is a communication port used for writing the write data from the host 100 into the disk devices 240 and reading data from the disk devices 240 in accordance with a read request from the host 100. The memory 232 temporarily stores data to be transferred to the disk devices 240 and data read from the disk devices 240. The BE packages 230 may have two or more ports 231 and memories 232.

The disk devices 240 are made up of, for example, hard disk drives ("HDDs") in this example and are physical storage devices that provide logical storage areas for storing data by application software, etc., executed by the host 100.

The one or more disk devices 240 may be organized on the basis of a parity group and operated as RAID (Redundant Array of Independent (or Inexpensive) Disks) to achieve higher reliability. The parity group consisting of the disk devices 240 is divided into one or more logical storage areas, each of which is defined as a logical volume 250 that is a unit logical storage area, as described above.

Although the HDD 240 is used as the physical storage medium in this example, the recording medium may be employed as a flash memory, a solid state drive ("SSD"), or an optical disk such as DVD.

Configuration of Memory Package 220

FIG. 3 depicts a detailed exemplary configuration of the memory package 220. The control information unit 221 of the memory package 220 stores the control information used for the storage system 200 executing the data IO processes from the host 100 and the processes related to the present invention in table format. In this example, the control information unit 221 stores a volume table 2211, a responsible MPPK table 2212, and a local copy table 2213.

The program unit 222 stores programs executed by the MPPK 210. In this example, the program unit 222 stores an IO program 2222, a responsibility changing program 2224, a cost-determined responsibility changing program 2261, a responsible MPPK manual changing program 2262, and a local copy pair operation program 3221. Details of the tables and programs will be described later with reference to the related drawings. The cache unit 223 is used as a primary storage area of data given and received between the host 100 and the disk devices 240 as described above and will not be described in detail.

Control Information Unit 221

The tables stored in the control information unit 221 of the memory package 220 will then be described. FIG. 4 depicts an example of the volume table 2211 stored in the control information unit 221.

Volume Table 2211

The volume table 2211 stores attribute information related to the volumes 250 that is the unit logical storage areas provided by the disk devices 240. The volume table 2211 includes a volume number field 22111 and a volume attribute field 22112 having a function bit and a pair number as information. For simplicity, the information itself recorded in the fields set in tables such as the volume table 2211 will hereinafter be represented with the same reference numerals as those added to the fields recording the information, for example, "volume number 22111".

The volume number field 22111 records the volume number that is an identification code for uniquely identifying each of the volumes 250 within the storage system 200. The volume numbers are serially added as the unique numbers by the MPPK 210 to a plurality of the volumes 250 provided by the disk devices 240.

In the volume attribute field 22112, the function bit is information of the storage function (described later) applied to the volume 250 identified by the volume number 22111 and the pair number is the number added by the MPPK 210 for identifying the volume 250 forming a pair with the relevant volume 250 in the storage function. The example of FIG. 3 indicates that SVOL (Secondary VOLume) of the local copy function is applied as the storage function to the volume 250 identified by the volume number 2 and that the volume 250 forming a pair has the volume number of 1.

The relationship between the certain volume 250 and the MPPK 210 responsible for the process of the volume 250 will then be described. In the storage system 200 of this example, the MPPK 210 responsible for the data process (such as an IO process from the host 100 to the volume 250) is preliminarily determined for each of the volumes 250. The MPPK 210 accessing the control information necessary for a certain data process of the volume 250 can be limited to one MPPK by preliminarily determining the MPPK 210 responsible for the data process of each of the volumes 250.

If the MPPK 210 executing the data process for the certain volume 250 is preliminarily determined and limited to one MPPK 210, the process of the volume 250 may be accelerated since communication with another one of the MPPKs 210 is not necessary and the control information necessary for the process may be stored in the local memory of the one MPPK 210. For example, if the local memory 212 is provided with information indicative of what address the dirty data (data written into the cache unit 223 and not yet destaged into the disk device 240) of the data of the volume 250 is located at or with a copied bitmap indicative of differential data in a local copy function described later, the process of the MPPK 210 accessing to these pieces of information can be accelerated.

When the responsible MPPK 210 responsible for the certain volume 250 is determined, the FE package 260 must receive IO from the host 100 and allocate the IO request to the responsible MPPK 210 based on the information of the IO destination volume 250. The FE package 260 retains a responsible MPPK table 263 as information for implementing the allocation.

FIG. 5 depicts an exemplary configuration of the memory 262. The memory 262 stores the responsible MPPK table 263 used in the process of the FE package 260. FIG. 6 depicts an example of the responsible MPPK table 263.

The responsible MPPK table 263 includes a volume number field 2631 and a responsible MPPK number field 2632. The volume number field 2631 records the volume number that is the same identification code for the volume 250 as the volume number field 22111 of the volume table 2211.

The responsible MPPK number field 2632 is the identification number of the MPPK 210 responsible for the process of the volume 250 (such as an IO process to the relevant volume 250) identified by the volume number 2631. The MPPK number is the identification number uniquely added to each of the MPPKs 210 by a system administrator in advance before the start of operation of the storage system 200. If the FE package 260 receives IO from the host 100, the FE package 260 searches the responsible MPPK table 263 for the volume number 2631 given to the IO object volume 250 to acquire the MPPK number 2632 of the MPPK 210 responsible for the IO object volume 250 and transmits the IO to the corresponding MPPK 210.

The responsible MPPK table 2212 is also retained in the control information unit 221 of the memory package 220. FIG. 7 depicts an example of the responsible MPPK table 2212 in the control information unit 221.

The responsible MPPK table 2212 in the control information unit 221 has the same configuration as the responsible MPPK table 263 retained in the FE package 260 and includes a volume number field 22121 and a responsible MPPK number field 22122. The example of FIG. 6 indicates that the responsible MPPK 210 for the volume 250 identified by the volume number of 1 has the responsible MPPK number 22122 of 1.

Description of Storage Functions

Local Copy Function

The applications of the present invention will then sequentially be described for the storage functions in the information processing system 1 of FIG. 1 including the storage system 200.

One of the storage functions is a local copy function. The local copy function is a function of creating from data stored in one of the volumes 250 a copy in another one of the volumes 250. The local copy function correlates the two volumes 250, which are the volume 250 of a copy source (Primary Volume, hereinafter, "PVOL") and the volume 250 of a copy destination (Secondary Volume, hereinafter, "SVOL"). A pair of the PVOL and the SVOL correlated is hereinafter referred to as a local copy pair or, simply, a pair.

The process executed by the storage system for the volume set as the pair of the local copy function will hereinafter be described. First, the normal operation of the local copy function will briefly be described.

In the local copy function, first, a local copy start instruction is received from the host 100 or the maintenance terminal 270. This instruction includes the respective volume numbers 22111 given to the PVOL and the SVOL. When the instruction is received, the local copy function records the pair number, the PVOL number, the SVOL number, and the pair status.

The local copy function provides a function of copying data stored in the PVOL at a certain time to the SVOL and a function of keeping the data stored in the PVOL and the SVOL always identical. The local copy function further provides a forward pair resynchronization function of dividing the pair of the PVOL and the SVOL to permit the host 100 to perform read/write from/to each of the PVOL and the SVOL and reflecting data written into the PVOL while the pair is split to the SVOL to make the data of the PVOL and the SVOL identical again and, conversely, a backward pair resynchronization function of reflecting data written into the SVOL while the pair is split to the PVOL to make the data of the PVOL and the SVOL identical again.

FIG. 8 depicts an example of the local copy table 2213 of this example. The local copy table 2213 is a table for managing the relation between the PVOL and the SVOL set as a pair provided with the local copy function.

The local copy table 2213 includes a pair number field 22131, a PVOL number field 22132, an SVOL number field 22133, and a pair state field 22134. The pair number field 22131 records the pair number that is the number allocated to a pair of the PVOL and SVOL with the local copy function set. The pair number 22131 may be used for uniquely identifying the pair within the storage system 200.

The PVOL number 22132 is the volume number of the PVOL that is the copy source of the local copy. The SVOL number 22133 is the volume number of the SVOL that is the copy destination of the local copy.

The pair state 22134 is a variable used for changing how the process should be executed at the time of the data input/output of the host 100 for the PVOL or the SVOL of the pair. If the pair state is recorded as "synchronization", the storage system 200 copies the write data for the PVOL to the SVOL. If the pair state is recorded as "split", the storage system 200 only records that data is written into a copied bitmap (not shown) retaining differential data generated by the PVOL data write without copying the write data for the PVOL to the SVOL.

Exemplary Process with Conventional Local Copy Function

An example of an IO process of the storage system 200 will be described with reference to FIG. 9 as an IO process for the PVOL when the local copy function is applied to a pair of the volumes 250 consisting of the PVOL and the SVOL and the pair state is the "synchronization" above. This process is performed by executing the IO program 2222 in the memory package 220 for each of the volumes 250 on the PVOL and SVOL sides.

The processor 211 receives an IO process request from the host 100 with the IO program 2222 of FIG. 9 (S101) to identify the IO object volume 250 (PVOL) and ensure resources such as the cache memory 223 and a data transfer engine (not shown) necessary for the input/output process (S102a).

The processor 211 transfers data from the port 261 to the cache memory 223 (S103a) and returns a response to the host 100, i.e., makes an IO process completion report (S104a).

The processor 211 subsequently acquires the MPPK number 22122 of the responsible MPPK 210 for the secondary volume 250 (SVOL) from the local copy table 2213 and the responsible MPPK table 2212 (S125) to determine whether the responsible MPPK 210 is the same as the MPPK 210 responsible for the IO object volume (i.e., the MPPK 210 to which the processor 211 executing the process belongs) (S126). If the MPPKs are the same (S126, Yes), the same processor 211 may execute the data transfer process to the secondary volume 250.

The processor 211 belonging to the responsible MPPK 210 ensures resources (such as a data transfer engine and the cache memory 223 allocated to the secondary volume 250) necessary for the transfer to the secondary volume 250 (SVOL) (S127a), performs the data transfer from the cache memory 223 allocated to the IO object volume 250 to the cache memory 223 allocated to the secondary volume 250 (S128a), and releases the resources ensured at S127a (S129a). The processor 211 subsequently releases the resources ensured at S102a (S105a) to complete the process (S120a).

If it is determined that the responsible MPPK 210 for the secondary volume 250 (SVOL) is different from the MPPK 210 responsible for the IO object volume 250 (PVOL) (S126, No), the processor 211 belonging to the responsible MPPK 210 for the secondary volume 250 (SVOL) must execute the data transfer process to the secondary volume 250. Therefore, the processor 211 responsible for the PVOL transmits a copy request (including the address of the cache memory 223 copied at S103a and a copied data length) (S130) to make a request for the copy process to the processor 211 of the responsible MPPK 210 for the secondary volume 250 (SVOL).

The processor 211 of the responsible MPPK 210 for the secondary volume 250 (SVOL) receives the copy request generated at S130 (S131), ensures resources necessary for the data transfer to the secondary volume 250 (S127b), performs the data transfer from the cache memory 223 allocated to the IO object volume 250 (PVOL) to the cache memory 223 allocated to the secondary volume 250 (S128b), transmits a copy completion report to the processor 211 of the MPPK 210 responsible for the IO object volume (S132), and releases the resources ensured at S127b (S129b) to complete the process (S120b).

The processor 211 of the MPPK 210 responsible for the IO object volume receives the copy completion report (S133) and executes above S105a to complete the process (S120a).

If the MPPK 210 responsible for the IO object volume 250 acting as the PVOL is different from the MPPK 210 responsible for the secondary volume 250 acting as the SVOL, the communication process (S130, S131, S132, S133) must be executed between the processors 211 of the MPPKs 210 and, therefore, it is problematic that the process overhead of the processors 211 increases.

Exemplary Process with Local Copy Function of the Present Example

FIG. 10 is a flowchart of an example of the local copy process in example 1 of the present invention. The local copy process shown in FIG. 10 is implemented by the processor 211 of the MPPK 210 executing a local copy program 3222 (hereinafter, "copy program") stored in the program unit 222 of the memory package 220. The copy program 3222 is called from a program, etc., checking the above copied bitmap to activate the copy process.

Although the local copy process of FIG. 10 is an example on the premise that the process is activated by the responsible MPPK 210 for the PVOL 250, the process does not necessarily need to be activated by the responsible MPPK 210 for the PVOL 250.

First, the processor 211 identifies where a difference of stored data of the PVOL 250 and the SVOL 250 is located from the copied bitmap with the copy program 3222 (S500). The processor 211 refers to the responsible MPPK table 2212 to check whether the responsible MPPK 210 for the PVOL 250 is the processor's MPPK 210 (S501). If it is determined that the responsible MPPK 210 for the PVOL 250 is different (S501, No), the process is terminated (S507) and reactivated with the responsible MPPK 210 for the PVOL 250. If one of the two MPPKs 210 determines that the responsible MPPK 210 for the PVOL 250 is not the processor's MPPK 210 in this example, the other MPPK 210 reactivates this process. If three or more MPPKs 210 are provided, the respective MPPKs 210 make the determination of the responsible MPPK 210 in accordance with a predetermined order.

If it is determined that the activated MPPK 210 is the responsible MPPK 210 for the PVOL 250 (S510, Yes), the processor 211 checks whether the responsible MPPK 210 for the SVOL 250 is the processor's MPPK 210 (S502). If it is determined that the processor's MPPK 210 is the responsible MPPK 210 for the SVOL 250 (S502, Yes), the processor's MPPK 210 is the responsible MPPK 210 for the both volumes 250 of the PVOL 250 and the SVOL 250 and, therefore, the data is copied from the PVOL 250 to the SVOL 250 (S504) to terminate the process (S507).

Description will then be made of the process when the responsible MPPK 210 for the SVOL 250 is different from the responsible MPPK 210 for the PVOL 250. If it is determined that the processor's MPPK 210 is not the responsible MPPK 210 for the SVOL 250 at S502 (S502, No), the copy program 3222 makes a request for the process on the SVOL side to the responsible MPPK 210 for the SVOL 250 and waits for a response from the responsible MPPK 210 for the SVOL 250 (S508). The contents of the copy job are to notify the responsible MPPK 210 for the SVOL 250 of the address of data to be copied.

The processor 211 of the responsible MPPK 210 for the SVOL 250 receives the request for the process on the SVOL side from the processor 211 of the responsible MPPK 210 for the PVOL 250. The processor 211 on the SVOL side copies the data from the PVOL 250 to the SVOL 250 (S511). Finally, the processor 211 of the responsible MPPK 210 for the SVOL 250 reports the completion to the processor 211 of the responsible MPPK 210 for the PVOL 250 (S513).

When the processor 211 of the responsible MPPK 210 for the PVOL 250 receives the completion report from the processor 211 of the responsible MPPK 210 for the SVOL 250 (S509), the process is terminated (S507).

After creating the pair of the volumes 250 with the local copy function set, the copy program 3222 executes the process of the processor 211 until the data of the PVOL 250 and the SVOL 250 becomes identical again through the resynchronization after the pair is split.

Responsible MPPK Changing Process

A changing process of the responsible MPPK 210, i.e., a process of matching the MPPK 210 responsible for the PVOL 250 with the MPPK 210 responsible for the SVOL 250 will then be described with reference to FIGS. 11 and 12.

The pair operation program 3221 of FIG. 11 is a program executed for the processor 211 receiving a request for pair generation, pair split, resynchronization, or cancellation of the local copy function, changing the responsible MPPK 210 for the volume 250 as needed, and changing the pair state.

With the pair operation program 3221, the processor 211 judges an operation request received by the storage system 200 from the administrator through the maintenance terminal 270 (S201).

If the operation request is the pair creation, a necessary operation availability check process is executed (e.g., the volume 250 specified by the administrator is not defined as a pair with another volume 250) (S202a) and the responsible MPPK numbers 22122 of the PVOL 250 and the SVOL 250 specified by the administrator are acquired from the responsible MPPK table 2212 (S203a) to determine whether the responsible MPPK 210 is the processor's MPPK 210 (S204a).

If it is determined that the responsible MPPKs 210 of the PVOL 250 and the SVOL 250 are not the same (S204a, No), the processor 211 uses the pair operation program 3221 to specify the SVOL 250 as the change object volume 250 and the responsible MPPK 210 for the PVOL 250 as the destination MPPK 210 to call the responsibility changing program 2224 described later to change the responsible MPPK 210 for the SVOL 250 to the responsible MPPK 210 for the PVOL 250 (S205a) and the process goes to S211a described later.

If it is determined that responsible MPPKs 210 of the PVOL 250 and the SVOL 250 are the same (S204a, Yes), the responsibility changing program 2224 is not called. The processor 211 allocates a record of the new pair to the local copy table 2213, writes the pair state 22134, the PVOL number 22132, and the SVOL number 22133, rewrites the volume attribute 22112 including the function bit and the pair number of the volume table 2211 (S211a), and completes the process (S220).

If it is determined that the operation request is "pair split", "pair cancellation", "forward pair resynchronization", or "backward pair resynchronization", a necessary operation availability is checked (e.g., the volume 250 specified by the administrator is defined as a pair) (S202b to S202e). If the operation request is "pair split", "forward pair resynchronization", or "backward pair resynchronization", the pair state 22134, the PVOL number 22132, and the SVOL number 22133 of the local copy table 2213 are rewritten (S211b to S211d). If the operation request is "pair cancellation", the corresponding record of the local copy table 2213 is cleared and the volume attribute 22112 including the function bit and the pair number of the volume table 2211 is rewritten (S211e) to complete the process (S220).

The responsible MPPK changing process for changing the responsible MPPK 210 will then be described. The responsibility changing program 2224 shown in FIG. 12 is a program actually changing the responsible MPPK 210 by updating the responsible MPPK number 22122 recorded in the responsible MPPK table 2212. If the processor 211 executes the process of the responsibility changing program 2224, the change destination MPPK 210 can start the process of the object volume 250 of the changing.

The responsibility changing program 2224 writes the control information of the object volume 250 (e.g., information indicative of the address of the cache unit 223 storing dirty data of the object volume 250) from the local memory 212 of the change source MPPK 210 into the control information unit 221 of the memory package 220 (S400).

The responsibility changing program 2224 then updates the responsible MPPK number 22122 of the responsible MPPK table 2212. If the responsible MPPK 210 is changed from MPPK 1 to MPPK 2, the responsible MPPK number 22122 is changed from 1 to 2 (S401). The responsibility changing program 2224 determines whether another storage function is set to the object volume 250 (S402). If it is determined that another storage function is set (S402, Yes), the responsibility changing program 2224 writes the control information (e.g., copied bitmap) related to that function from the local memory 212 to the control information unit 221 of the memory package 220 (S403) to terminate the process (S404). If it is determined that no another storage function is set (S402, No), S403 is skipped to terminate the process (S404).

A variation of this example will then be described with reference to FIG. 13. FIG. 13 is a flowchart of an example of the process of the IO program 2222 in the variation of this example. To match the data of the PVOL 250 and the SVOL 250 by copying data from the PVOL 250 to the SVOL 250 with the IO program of FIG. 9, the IO request from the host 100 to the PVOL 250 must be stopped to copy the entire data from the PVOL 250 to the SVOL 250 in advance with the copy program 3222 shown in FIG. 10 (forward synchronization process).

To avoid this process and copy the data while accepting the IO request, a process is executed to turn on the bit corresponding to a difference generated due to the write request to the PVOL 250 and turn off the copied bitmap (S134) instead of executing the data copy to the SVOL 250 (S126 to S129*a* and S130 to S133) in FIG. 13 unlike FIG. 9. The processor 211 can execute the process of the copy program 3222 shown in FIG. 10 in the background to copy data in the area with the copied bitmap turned off from the data stored in the PVOL 250. Therefore, the stored data of the PVOL 250 and the SVOL 250 can be matched. As a result, a copy (snapshot) of the PVOL 250 at a certain time can be created while accepting the write request from the host 100.

Since the responsible MPPKs 210 of the PVOL 250 and the SVOL 250 are controlled to be identical by the process shown at S204*a* and S205*a* of FIG. 11, the communication process between the MPPKs 210 shown in FIG. 9 (S130, S131, S132, S133) and the communication process between the MPPKs 210 shown in FIG. 10 (S508, S509, S513) become unnecessary and, therefore, the process overhead of the processor 211 can be reduced.

EXAMPLE 2

Example 2 of the preset invention will then be described with reference to FIGS. 14 to 16. FIG. 14 represents an example of the responsible MPPK table 2212 in example 2 of the present invention. In FIG. 14, the responsible MPPK table 2212 includes a manual change availability flag field 22123 unlike FIG. 7. In example 2 of the present invention, when the manual change availability flag 22123 is OK, the MPPK responsible for the corresponding volume can manually be changed and when the flag is NG, this indicates that the manual changing is not available.

FIG. 15 is a flowchart of an example of the process of the pair operation program 3221 in example 2 of the present invention. In FIG. 15, unlike FIG. 11 of example 1, change NG steps S210*a*, S210*c*, and S211*d* are provided before the state change steps S211*a*, S211*c*, and S211*d*, respectively; change OK steps S212*b* and S212*e* are provided after the state change steps S211*b* and S211*e*; and a responsibility acquisition step S203*c*, an identity checking step S204*c*, and a responsibility changing step S205*c* are provided after the availability checking step S202*c*.

At the change NG steps S210*a*, S210*c*, and S211*d*, the processor 211 sets NG for the manual change availability flags 22123 of the responsible MPPK table 2212 corresponding to the PVOL 250 and the SVOL 250. On the other hand, at the change OK steps S212*b* and S212*e*, the processor 211 sets OK for the manual change availability flags 22123 of the responsible MPPK table 2212 corresponding to the PVOL 250 and the SVOL 250.

FIG. 16 is a flowchart of an example of the process of the responsible MPPK manual changing program 2262 in example 2 of the present invention. The responsible MPPK manual changing program 2262 is applied to the responsibility changing steps 205*a*, 205*c*, and S205*c* of FIG. 15, for example.

The processor 221 accepts an operation request received by the storage system 200 from the administrator through the maintenance terminal 270 (S1601) and refers to the manual change availability flags 22123 of the responsible MPPK table 2212 corresponding to the change object volume 250 in the operation request (S1602) in accordance with the responsible MPPK manual changing program 2262.

If the manual change availability flag 22123 is OK (S1602, Yes), the responsibility changing program 2224 is called to change the responsible MPPK 210 for the change object volume 250 (S1603) to complete the process (S1604). If the manual change availability flag 22123 of the responsible MPPK table 2212 is not OK (S1602, No), the process is completed without calling the responsibility changing program 2224 (S1604).

When a pair for the local copy is instructed to be split or canceled, the responsible MPPK 210 can manually be changed as above. Since the write data into the PVOL 250 is not necessary to be reflected on the SVOL 250 while the pair is split and the process overhead of the processor 210 does not increase even if the respective responsible MPPKs 210 are different, manually changing the responsible MPPK 210 poses no problems. If one of the responsible MPPKs 210 is under a higher cost, the cost can be distributed instead by manually transferring the process of one MPPK to the other MPPK 210.

On the other hand, when a split pair is resynchronized, if the respective responsible MPPKs 210 of the PVOL 250 and the SVOL 250 are different, the communication process (S508, S509, S513) shown in FIG. 10 occurs and the processing efficiency of the processor 211 is reduced. If the processor 211 executes S203*c*, S204*c*, and S205*c*, the responsible MPPKs 210 of the PVOL 250 and the SVOL 250 can be matched when resynchronizing the pair and the matched responsible MPPKs 210 of the PVOL 250 and the SVOL 250 can be prevented from being manually changed by the processor 211 executing the process of S210*a*, S210*c*, and S210*d*.

As described above, example 2 of the present invention can achieve the manual load balancing at the time or the pair split and the processing efficiency enhancement at the time of resynchronization.

EXAMPLE 3

Example 3 of the preset invention will then be described with reference to FIGS. 17 to 21. FIG. 17 depicts an exemplary configuration of the memory package 200 in example 3 of the present invention. Unlike the configuration used in example 1 of FIG. 3, the memory package 200 of FIG. 17 includes an MPPK usage rate table 2217 (described later) and a responsibility changing threshold table 2251 (described later) in the control information unit 221.

FIG. 18 depicts an example of the MPPK usage rate table 2217 managing the usage rate that is a rate of the MPPK 210 conducting a process. The MPPK usage rate table 2217 consists of an MPPK number field 22171 and a usage rate field 22172, The MPPK number 22171 is the identification number of the MPPK 210 already described. The usage rate 22172 represents a peak value of a usage rate of the corresponding MPPK 210 during a certain time period on percentage. For example, the maximum value of the usage rate per second of each of the MPPKs 210 is stored for each week.

FIG. 19 depicts an example of the responsibility changing threshold table 2251 in example 3 of the present invention. The responsibility changing threshold table 2251 retains a function type field 22511 for the storage functions and a cost threshold value 22512 prescribed for the MPPK 210 responsible for the PVOL 250 in the corresponding function type. The PVOL threshold value 2512 is used as a criterion of whether the ownership of the SVOL 250 should be moved to the MPPK 210 having the ownership of the PVOL 250 and is compared with the usage rate of the MPPK 210 having the ownership of the PVOL 250.

FIG. 20 is a flowchart of an example of the process of the pair operation program 3221 in example 3 of the present invention. Unlike FIG. 15, FIG. 20 includes cost-determined responsibility changing steps S206a and S206c instead of the responsibility changing steps S205a and S205c, respectively. The cost-determined responsibility changing steps S206a and S206c are different from the responsibility changing steps S205a and S205c in that the processor 211 specify the PVOL number 22132 and the SVOL number 22133 to call the cost-determined responsibility changing program 2261 (described later) instead of the responsibility changing program 2224.

FIG. 21 is a flowchart of an example of the process of the cost-determined responsibility changing program 2261. First, with the cost-determined responsibility changing program 2261, the processor 211 acquires the usage rate 22172 of the MPPK 210 responsible for the process of the PVOL 250 by reference to the MPPK usage rate table 2217 (S301).

The processor 211 compares the PVOL cost threshold value 22512 recorded in the responsibility changing threshold table 2251 with the usage rate 22172 of the corresponding MPPK 210 acquired at S301 (S302) and if the usage rate 22172 is smaller than the PVOL cost threshold value 22512 (S302, No), the processor 211 specifies the SVOL 250 as the change object volume 250 and the responsible MPPK 210 for the PVOL 250 as the destination MPPK 210 to call the responsibility changing program 2224 to change the responsible MPPK 210 for the SVOL 250 to the responsible MPPK 210 for the PVOL 250 (S320) and the process is completed (S330).

If the usage rate 22172 is not smaller than the PVOL cost threshold value 22152 (S302, No), the processor 211 completes the process without calling the responsibility changing program 2224 (S330). Therefore, in this case, the responsible MPPK 210 for the SVOL 250 is not changed.

As described above, since the processor 211 changes the responsibility of the MPPK 210 responsible for the SVOL 250 only when the usage rate 22172 of the destination MPPK 210 is smaller than the PVOL cost threshold value 22512 recorded in the responsibility changing threshold table 2251 in example 3, the responsibility can be prevented from being changed to the MPPK 210 on the PVOL side having the high usage rate 22172 by adjusting the PVOL cost threshold value 22512.

EXAMPLE 4

Example 4 of the preset invention will then be described with reference to FIGS. 22 and 23. FIG. 22 depicts an example of the responsibility changing threshold table 2251 in example 4 of the present invention. In FIG. 22, unlike FIG. 19, SVOL cost threshold value 22513 is retained for each of the function type fields 22511 for the storage functions. The SVOL cost threshold value 22513 is used as a criterion of whether the responsible MPPK 210 for the PVOL 250 can be changed to the responsible MPPK 210 for the SVOL 250 and is a value compared with the usage rate 22172 of the MPPK 210 responsible for the SVOL 250.

FIG. 23 is a flowchart of an example of the process of the cost-determined responsibility changing program 2261 in example 4 of the present invention. FIG. 23 includes S303, S304, and S321 between S302 and S330 unlike FIG. 21.

If the MPPK usage rate 22172 on the PVOL side is not smaller than the threshold value (S302, Yes), the processor 211 acquires the usage rate 22172 of the responsible MPPK 210 for the SVOL 250 by reference to the MPPK usage rate table 2217 through the corresponding MPPK number 22172 at S303 (S301). The processor 211 compares the SVOL cost threshold value 22513 recorded in the responsibility changing threshold table 2251 with the usage rate 22172 acquired at S303 and if the usage rate 22172 is smaller than the SVOL cost threshold value 22513 (S304, No), the processor 211 specifies the PVOL 250 as the change object volume 250 and the responsible MPPK 210 for the SVOL 250 as the destination MPPK 210 to call the responsibility changing program 2224 to change the responsible MPPK 210 for the PVOL 250 to the responsible MPPK 210 for the SVOL 250 (S321) and the process is completed (S330).

If the usage rate 22172 is equal to or larger than the SVOL cost threshold value 22153 (S304, Yes), the processor 211 completes the process without calling the responsibility changing program 2224 (S330). Therefore, in this case, the responsible MPPK 210 for the PVOL 250 is not changed.

As described above, since the processor 211 changes the responsibility when the usage rate 22172 of the destination MPPK 210 is lower than the SVOL cost threshold value 22512 recorded in the responsibility changing threshold table 2251 in example 4, the responsible MPPK 210 for the PVOL 250 can be changed to the responsible MPPK 210 for the SVOL 250 and the responsibility can be prevented from being changed to the MPPK 210 having the high usage rate 22172 by adjusting the SVOL cost threshold value 22513.

EXAMPLE 5

Example 5 of the preset invention will then be described with reference to FIGS. 24 and 25. FIG. 24 depicts an example of the local copy table 2213 in example 5 of the present invention. FIG. 24 includes a PVOL movability flag 22135 (described later) unlike FIG. 8.

FIG. 25 is a flowchart of an example of the process of the cost-determined responsibility changing program 2261 in example 5 of the present invention. FIG. 25 includes S305 between S304 and S321 unlike FIG. 23.

At S305, the processor 211 refers to the PVOL movability flag 22135 of the local copy table 2213 (S305) and if the PVOL movability flag 22135 is positive (S305, Yes), S321 is consecutively executed to change the responsible MPPK 210 for the PVOL 250 to the responsible MPPK 210 for the SVOL 250. If the PVOL movability flag 22135 is negative (S305, No), the process is simply completed (S330). In this case, the responsible MPPK 210 for the PVOL 250 is not changed.

As described above, if the PVOL movability flag 22135 recorded in the local copy table 2213 is negative, the processor 211 does not change the responsibility in example 5. Therefore, the responsibility of the MPPK 210 on the PVOL side can be prevented from being changed by setting the PVOL movability flag 22135 negative for a pair desired to be kept from the effect on performance due to the changing of the responsibility in such a case that the pair is used in online operations, and the processor 211 can be driven to execute the changing of the responsibility for other pairs depending on the costs.

EXAMPLE 6

Application to Extended Volume Function

Example 6 of the preset invention will then be described with reference to FIGS. 26 to 29. FIG. 26 depicts an exemplary configuration of the memory package 220 in example 6. FIG. 26 includes an extended volume table 2214 (described later) in the control information unit 221 and an extended volume operation program 3222 (described later) in the program unit 222 unlike FIG. 17.

An extended volume function will then be described, which is one of the storage functions. As is the case with the local copy function, a schematic of the extended volume function will be described, and a problem in the architecture of determining the responsible MPPK 210 in advance and a changing method of the responsible MPPK 210 will be described.

The extended volume function is a function of collectively providing a plurality of the volumes 250 as one large-capacity volume 250 to the host 100 and is also referred to as a concatenation function. The volume 250 made up of a plurality of the volumes 250 is referred to as an extended volume, and the volumes 250 making up the extended volume are referred to as constituent volumes. By using a plurality of the volumes 250, the disk devices 240 may be used more than the normal volume 250 and the high-performance and large-capacity volume 250 may be provided. The host 100 recognizes the extended volume as the one high-performance and large-capacity volume 250 instead of a group of a plurality of the volumes 250.

FIG. 27 is an example of the extended volume table 2214 for managing the extended volumes. The extended volume table 2214 consists of an extended volume number field 22141 and a constituent volume number field 22142. The extended volume number 22141 is the identification number for identifying each of the extended volumes.

In this example, the extended volume number field 22141 is defined as the volume number added to any one volume 250 of the constituent volumes 250 making up each of the extended volumes. Therefore, the IO request from the host 100 is allocated by the FE package 260 to the responsible MPPK 210 for the volume 250 having the constituent volume number 22142 same as the extended volume number 22141. The constituent volume number 22142 is the identification number for the constituent volume 250 making up the extended volume.

In example of FIG. 27, the extended volume is made up of three volumes having the constituent volume numbers of 1, 2, and 3, and the extended volume number 22141 of the extended volume is 1. The IO request from the host 100 is allocated to the responsible MPPK 210 for the constituent volume 250 having the constituent volume number of 1. Even if the object area of the IO request from the host 100 is included in the constituent volume 250 having the constituent volume number of 2, the IO request is allocated to the responsible MPPK 210 for the constituent volume 250 having the constituent volume number of 1. If the responsible MPPK 210 for the constituent volume 250 having the constituent volume number of 2 is different from the responsible MPPK 210 for the constituent volume 250 having the constituent volume number of 1, the responsible MPPK 210 for the constituent volume 250 having the constituent volume number of 1 is unable to execute the process of the constituent volume 250 having the constituent volume number of 2.

A process mode of IO issued to the extended volume will then be described with reference to FIG. 28. FIG. 28 depicts an example of the process of the IO program executed in the case of the issuance to the extended volume.

The IO program 2222 identifies the constituent volume 250 including the start address of the IO object area (S700). The IO program 2222 determines whether the responsible MPPK 210 for the constituent volume 250 identified at S700c is the MPPK 210 of the IO program (S701).

If the responsible MPPK 210 for the constituent volume 250 is the MPPK 210 of the IO program (S701, Yes), the IO program 2222 then executes the IO within an executable range for the relevant constituent volume 250. Specifically, the IO program 2222 determines whether the end address of the IO is included in the constituent volume 250 (S703). If included (S703, Yes), the IO program 2222 executes the IO for the constituent volume 250 to the end of the IO range specified by the host 100 (S707) and terminates the process (S709).

On the other hand, if the end address of the IO is not included in the constituent volume 250 at S703 (S703, No), this means that the IO range from the host 100 includes the next constituent volume 250. In this case, the IO program 2222 executes the IO to the end address stored in the currently processed constituent volume 250 (S704), defines the constituent volume 250 next to the currently processed constituent volume 250 as a volume to be processed, and returns to S701 (S706). The IO can completely be executed by repeatedly executing 5701 to S706.

If it is determined that the responsible MPPK 210 for the constituent volume 250 is another MPPK 210 (S701, No), the IO program 2222 requests the responsible MPPK 210 for the constituent volume 250 to execute the IO process (S710). The responsible MPPK 210 receiving this request executes 5700 to 5710 of the IO program 2222 to process the IO.

As can be seen from the description of FIG. 28, if the responsible MPPKs 210 for the constituent volumes 250 are different in the same extended volume, the MPPKs 210 must communicate in synchronization with IO.

FIG. 29 shows an example of the process of the extended volume operation program 3222. The extended volume operation program 3222 is a program used for the processor 211 receiving a request for volume addition or volume deletion of the extended volume function and changing the responsible MPPK 210 of the volume 250 to change the configuration as needed.

With the extended volume operation program 3222, the processor 211 determines an operation request received by the storage system 200 from the administrator through the maintenance terminal (S1401). If the operation request is the volume addition, the processor 211 executes a necessary operation availability check (e.g., the volume 250 specified by the administrator is not defined as the constituent volume 250 of another extended volume) (S1402a) and acquires the start volume 250 of the extended volume number 22141 specified by the administrator and the responsible MPPK volume number 22121 of the volume 250 to be added from the responsible MPPK table 2212 (S1403a).

It is then determined whether the responsible MPPK 210 is the same for the start volume 250 and the additional volume 250 (S1404a) and if not same (S1404a, No), the start volume 250 is specified as the PVOL and the additional volume 250 is specified as the SVOL to call the cost-determined responsibility changing program 2261 (S1405a). If the responsible MPPK 210 is the same for the start volume 250 and the additional volume 250 (S1405a, Yes), a configuration is changed by adding the constituent volume number 22142 for the corresponding extended volume number field 22141 of the extended volume table 2214 without calling the cost-determined responsibility changing program 2261 (S1411a). The constituent volume number 22142 to be added may sequentially be issued so as not to overlap with the constituent volume number 22142 already allocated to the existing extended volume.

If the constituent volume 250 is deleted from a certain extended volume, a necessary availability check is executed (e.g., the extended volume specified to be deleted exists) (S1402d) and if it is determined that the deletion is available, the configuration is changed by deleting the constituent volume number 22142 for the corresponding extended volume number field 22141 of the extended volume table 2214 (S1411d).

In example 6 of the present invention, the cost-determined responsibility changing program 2261 may allocate the start volume 250 and the additional volume to the same MPPK 210 and may prevent the changing when the responsible MPPK 210 of the start volume is under a higher cost in the extended volume function as is the case with the local copy function in example 5 of the present invention.

EXAMPLE 7

Application to Remote Copy Function

Example 7 of the preset invention will then be described with reference to FIGS. 30 to 36. FIG. 30 depicts an exemplary configuration of the memory package 200 in example 7 of the preset invention. In FIG. 30, unlike FIG. 26, the control information unit 221 includes a remote copy group table 2215 (described later) and a responsible MPPK table (remote copy group) 2216 (described later) and the program unit 222 includes a pair operation program 3223 (described later) used in the remote copy function. Although not shown for simplicity, the program unit 222 also stores a remote copy program that provides a conventional basic function in the remote copy process. A configuration of this remote copy program will hereinafter be abbreviated as a copy program and used in the description as needed.

A remote copy function will then be described, which is one of the storage functions. As is the case with the local copy function, a schematic of the remote copy function will be described, and a problem in the architecture of determining the responsible MPPK 210 in advance and a changing method of the responsible MPPK 210 will be described.

The remote copy function is a function of creating a copy of data stored in the volume 250 of the certain storage system 200 into the storage system 250 in another chassis. As is the case with the local copy function, the copy source volume 250 and the copy destination volume 250 are referred to as PVOL and SVOL, respectively. Even if the storage system 200 on the PVOL side is damaged due to disaster or system failure, operations may be continued with the use of data stored in SVOL by preliminarily copying the data of PVOL into SVOL in the different storage system 200 with the use of the remote copy function.

FIG. 31 depicts an example of a configuration implementing the remote copy function. A primary storage system 300 is the storage system 200 having PVOL and a secondary storage system 400 is the storage system 200 having SVOL.

The configuration of the primary storage system 300 will first be described. PVOL 301 and PVOL 302 are the source volumes 250 of the remote copy. A journal volume 303 (hereinafter, "JVOL") is the volume 250 for temporarily storing data to be transferred to the secondary storage system 400.

The configuration of the secondary storage system 400 will now be described. The secondary storage system 400 has the same configuration as the primary storage system 300. SVOL 401 and SVOL 402 are the destination volumes 250 of the remote copy. JVOL 403 is the volume 250 for temporarily storing data transferred from the primary storage system 300 to the secondary storage system 400.

Arrows 307 indicate pair relations of the remote copy. In the example of FIG. 31, the PVOL 301 and the SVOL 401 make a pair. The copy of the PVOL 301 is the SVOL 401. The PVOL 302 and the SVOL 402 make a pair.

A schematic of the copy operation of the remote copy will now be described. When receiving a write request for the PVOL of the remote copy from the host 10, the copy program creates transfer data called journal consisting of write data and control information for the write data and stores the journal into the JVOL 303. After the completion of acceptance of the write request from the host 100, a journal 308 is copied from the JVOL 303 to the JVOL 403 of the secondary storage system 400. Finally, a journal 405 is read from the JVOL 403 and the write data in the journal 405 is written into the SVOL in the secondary storage system 400. The copy program copies the data of the PVOL into the SVOL as above.

An arrow 304 represents a write request to the PVOL 302. A journal 305 represents a state of the journal before being stored in the JVOL 303. The journal 308 represents a state of the journal being transferred from the primary storage system 300 to the secondary storage system 400. The journal 405 represents a state of the journal before being copied from the JVOL 403 to the SVOL 402 in the secondary storage system 400.

Lastly, a remote copy group 306 will be described. A remote copy group 406 is the same as the remote copy group 306.

The remote copy group 306 includes a plurality of the PVOLs 301 and 302, and a plurality of the JVOLs 308. The remote copy group 306 is characterized in that the write data is written into the SVOL in the write order issued by the host 100 for the PVOLs 301 and 302 in the same remote copy group 306. Specific description will be made with reference to the example of FIG. 31.

It is assumed that a write request 1 is issued from the host 100 to the PVOL 301 and that a write request 2 is subsequently issued to the PVOL 302. In this case, the secondary storage system 400 is controlled such that the write request 2 is written into the SVOL 402 after the write request 1 is written into the SVOL 401.

The write order is assured in the primary and secondary remote copy groups as above because if the write order is changed, operations may not be restored with the use of SVOL in such a case that data written into a certain PVOL earlier is not reflected on a destination SVOL.

The remote copy function stores a write order number described later in the journal and transfers the write order number to the secondary storage system 400 to assure the write order. The secondary storage system 400 writes the write data into the SVOL in the order of the write order number stored in the journal.

FIG. 32 depicts an example of the remote copy table 2215 that stores management information of the remote copy groups 306, 406. The remote copy table 2215 includes a remote copy group number field 22151, an attribute field 22152, a JVOL number field 22153, a PVOL number field 22154, an SVOL number field 22155, and a write order number field 22156.

The remote copy group number field 22151 records the remote copy group number that is the number for identifying each of the remote copy groups 306, 406. The attribute field 22152 records the attribute that is information indicative of whether each of the remote copy groups 306 and 406 identified by the remote copy group number is a source remote copy group or a destination remote copy group. The JVOL number field 22153 records the JVOL number that is the volume number for identifying the JVOL provided in the remote copy groups 306 and 406. The PVOL number field 22154 records the volume number of the PVOL included in the remote copy group 306. The SVOL number field 22155 records the volume number of the SVOL included in the remote copy group 406. The write order number field 22156 records the write order number that is the number given to journals in the order of data written into the PVOL. The write order number 22156 is automatically issued on the basis of a remote copy group each time the data is written into the PVOL.

In the example of FIG. 32, the remote copy group 306 having the remote copy group number of 1 is a source remote copy group including PVOL. This remote copy group 306 has JVOL 11, 12 and PVOL 1, 2, and 3. The copy destination SVOLs for data of the PVOLs 1, 2, and 3 are SVOLs 20, 12, and 13, respectively. Lastly, the current value of the write order number is 100. That is the next journal generated is allocated with the write order number of 100. After the allocation, the write order number 22156 is updated to 101.

If the remote copy table 2215 is stored in the local memory 212 in the MPPK 210 along with the control information necessary for the process of the volume 250, the performance of the write request to the PVOL can be improved.

However, the write order number 22156 of the remote copy table 2215 is referenced and updated every time a write request is generated. Therefore, to store the remote copy table 2215 in the local memory 212, the MPPK 210 accessing the write order number 22156 of the remote copy table 2215 must be limited to one MPPK 210 and the remote copy table 2215 must be stored only in this MPPK 210.

To implement this configuration, the remote copy function preliminarily determines the MPPK 210 responsible for the process of remote copy for each remote copy group and this MPPK 210 stores the remote copy table 2215 in the local memory 212 of the MPPK 210.

A journal creation process and a journal restore process will hereinafter be described as an example of the process referring to and updating the remote copy table 2215 every time one journal is processed.

An example of a journal creation process flow will be described with reference to FIG. 33. The journal creation process is performed by the processor 211 of the storage system 200 executing a write data reception program and a journal creation program (not shown) stored in the program unit 222 of the memory package 220.

When the write data reception program of the storage system 200 receives a write request from the host 100 (S3300), the write data is written into the write object volume 250 (S3301). The write data reception program then activates the journal creation program (S3302).

The journal creation program acquires the write order number field 22156 from the remote copy table 2215 (S3303). The journal creation program adds one to the acquired write order number to update the write order number in preparation for the write order number used in the subsequent journal creation (S3304).

The journal creation program creates a journal from the control information related to the journal, such as the acquired write order number 22156, the PVOL number 22154, the SVOL number 22155, and the remote copy group number 22151, and the write data to store the journal into the JVOL (S3305).

Since the usage rate of the JVOL is changed due to the storage of the journal, the journal creation program updates the usage rate of the JVOL (S3306). Lastly, the journal creation program makes a report of completion to the write data reception program that is the caller (S3307). The write data reception program 231 receives the report of completion and terminates the process (S3308).

An example of the process of writing from JVOL into SVOL the journal transferred from the PVOL side will be described with reference to FIG. 34. The process of writing the journal from JVOL into SVOL is referred to as a restore process. The restore process is performed by the processor 211 of the storage system 200 executing a restoring program (not shown) stored in the program unit 222 of the memory package 220.

The restoring program determines a journal to be restored (S3400). The journal to be restored is determined from the journals stored in the JVOL such that the write order number is increased in series from the oldest journal. For example, if journals having the write order number of 1 to 1000 exist, the journals having the write order number of 1 to 1000 are able to be restored. However, the journals having the write order number of 50 to 100 are unable to be restored. The journals having the write order number of 1 to 30 and 50 to 70 are unable to be restored. This is because the state of SVOL is always kept in s state possible in PVOL in the past by writing into SVOL the data written from the host 100 into PVOL in accordance with the write order number 22156. This enables the operation process utilizing SVOL to be resumed if a failure occurs in PVOL.

The restoring program substitutes the minimum value of the write order number 22156 of the journals determined to be restored for a variable i (S3401). The variable i is temporarily stored in the local memory 212 of the MPPK 210. The restoring program refers to the journals in order of the write order number to check whether the journals are to be restored (S3402). If it is determined that the journals are not to be restored (S3402, No), the restore process is terminated (S3410).

If it is determined that the journals are to be restored at S3402 (S3402, Yes), the restoring program executes a process of restoring the journals determined to be restored (S3403 to S3406).

The restoring program determines an application SVOL of the referenced journal (S3403). The journal created for the write to a certain PVOL must be restored in the SVOL in the pair relationship with the PVOL in the remote copy function. The restoring program determines the application SVOL of the journal with the use of the SVOL number 22155 storing the journal when the journal is created.

Once the application SVOL of the journal is determined, the restoring program writes the journal into the SVOL (S3404) and replaces the restored write order number 22156 with the write order number 22156 of the applied journal (S3405). Lastly, the restoring program adds one to the variable i (S3406) and returns to S3402 to process the next journal.

With the above configuration, the write data to the PVOL with the remote copy function set is copied to the SVOL while maintaining the order of the writing into the PVOL. The remote copy group configured in this way is generally referred to as a consistency group.

FIG. 35 depicts an example of a responsible MPPK table for remote group 2216 (hereinafter, for simplicity, "responsible MPPK table 2216") that manages the MPPK 210 responsible for the processes of the remote copy groups. The responsible MPPK table 2216 consists of a remote copy group number field 22161 and a responsible MPPK number field 22162.

The remote copy group number field 22161 records the remote copy group number 22161 that is the identification number for identifying the remote copy groups 306, 406. The responsible MPPK number field 22162 records the responsible MPPK number 22162 same as the case of the responsible MPPK table 2212 shown in FIG. 7.

Description will then be made of how the responsible MPPK is optimally set for the PVOL, the JVOL, the SVOL, and the remote copy groups of the remote copy function as described as to the local copy function and the extended volume function.

The process of remote copy in the primary storage system 300 will first be described. When receiving a write request from the host 100 to PVOL, the remote copy function writes data related to the write request into the PVOL and creates and stores a journal into JVOL. If the responsible MPPK 210 for the PVOL and the responsible MPPK 210 for the remote copy group are different, the responsible MPPK 210 for the PVOL must make a request for the journal creation process to the responsible MPPK 210 for the remote copy group. On this occasion, the responsible MPPK 210 for the PVOL and the responsible MPPK 210 for the remote copy group must communicate.

The journal created by the responsible MPPK 210 for the remote copy group is then stored in the JVOL. If the responsible MPPK 210 for the remote copy group and the responsible MPPK 210 for the JVOL are different, the responsible MPPK 210 for the remote copy group must make a request for the journal storage process to the responsible MPPK 210 for the JVOL. On this occasion, the responsible MPPK 210 for the remote copy group and the responsible MPPK 210 for the JVOL must communicate.

Finally, the journal stored in the JVOL is transferred to secondary storage system 400. Specifically, with the copy program implementing the remote copy function, the responsible MPPK 210 for the remote copy group determines the journal to be transferred and acquires the storage address of the JVOL storing the determined journal to transfer the journal. Therefore, if the responsible MPPK 210 for the remote copy group and the responsible MPPK 210 for the JVOL are different, the responsible MPPK 210 for the remote copy group must request the responsible MPPK 210 for the JVOL to transfer the journal to the secondary storage system 400 after identifying the journal to be transferred and determining the storage address. On this occasion, the responsible MPPK 210 for the remote copy group and the responsible MPPK 210 for the JVOL must communicate.

As above, in the primary storage system 300, the round-trip communication must be performed up to twice between the MPPKs 210 for creating the journal and the round-trip communication must be performed once between the MPPKs 210 for transferring the created journal.

The process of remote copy in the secondary storage system 400 will then be described. In the secondary storage system 400 the write data in the journal transferred from the primary storage system 300 and stored in the JVOL are written into the SVOL.

The copy program of the secondary storage system 400 searches a journal having the smallest write order number 22156 among the journals stored in the JVOL. It is then determined whether the write order number 22156 of the journal is the next to the write order number 22156 of the previous journal written into the SVOL. If the write order number 22156 of the searched and acquired journal is the next to the write order number 22156 of the previous journal written into the SVOL, the remote copy program activates the local copy program and gives an instruction for copying from the JVOL to the SVOL.

If the responsible MPPK 210 for the remote copy group and the responsible MPPK 210 for the JVOL are different, the copy program must be activated by the responsible MPPK 210 for the JVOL. On this occasion, the responsible MPPK 210 for the remote copy group and the responsible MPPK 210 for the JVOL must communicate.

If the responsible MPPK 210 for the JVOL and the responsible MPPK 210 for the SVOL are different, a request must be made for the local copy process on the SVOL side to the responsible MPPK 210 for the SVOL. On this occasion, the responsible MPPK 210 for the JVOL and the responsible MPPK 210 for the SVOL must communicate.

As above, the round-trip communication must be performed up to twice between the MPPKs 210 for writing the journal into the SVOL in the secondary storage system 400.

A method of avoiding the above communication between the MPPKs 210 will then be described.

FIG. 36 is a flowchart of an example of the process of the pair operation program 3223 of the remote copy function. The pair operation program 3223 is a program for the processor 211 receiving a request for pair generation, pair split, resynchronization, or cancellation of the remote copy function from the administrator through the maintenance terminal 270, etc., changing the responsible MPPK 210 for the volume 250 as needed, and changing the pair state.

With the pair operation program 3223, the processor 211 judges an operation request received by the storage system 200 from the administrator through the maintenance terminal 270 or from the other storage system 200 (S1501).

If the operation request is judged at S1501 as the pair creation or JVOL addition, the pair operation program 3223 executes the necessary operation availability check (e.g., the volume 250 specified by the administrator is not defined as another pair) (S1502a) and acquires the responsible MPPK numbers 22122 and 22162 of the PVOL 250 and the remote copy group 306 specified by the administrator, or the SVOL 250 and the remote copy group 406, or the JVOL and the remote copy group 306, 406 from the responsible MPPK tables 2212 and 2216 (S1503a).

The pair operation program 3223 uses the acquired responsible MPPK numbers 22122 and 22162 to determine whether the responsible MPPK 210 for the remote copy group 306 and the responsible MPPK 210 for the PVOL 250 and the JVOL are the same and whether the responsible MPPK 210 for the remote copy group 406 and the responsible MPPK 210 for the SVOL 250 and the JVOL are the same (S1504a). If it is determined that the responsible MPPKs 210 are not the same (S1504a, No), the remote copy group 306 is defined as the SVOL or the remote copy group 406 is defined as the PVOL to call the cost-determined responsibility changing program 2261 (S1506a) to change the responsible MPPK depending on the usage rate of the MPPK 210.

The processor 211 sets NG for the manual change availability flag of the responsible MPPK table 2212 (S1510a), changes the remote copy table 2215, rewrites the volume attribute 22112 including the function bit and the pair number of the volume table 2211 (S1511a), and completes the process (S1520).

If the operation request is judged at S1501 as the forward pair resynchronization or the backward pair resynchronization, only the details of availability check processes 1502c and 1502d and state changing processes S1511c and S1511d are different from the availability check processes 1502a and the state changing processes S1511a in the case of the pair creation and the JVOL addition, and the process details of other processes, for example, the cost-determined responsibility changing processes S1506a, S1506c, S1506d, S1510a, S1510c, and S1510d are the same.

If the operation request is judged at S1501 as the pair split, the pair cancellation, or the JVOL deletion, the necessary operation availability check is executed (e.g., the volume 250 specified by the administrator is defined as a pair) (S1502b, S1502e); the remote copy table 2215 is changed; the function bit and the pair number recorded in the volume attribute field 22112 of the volume table 2211 are rewritten (S1511b, S1511e); the manual change availability flag of the responsible MPPK table 2212 is set to OK (S1512b, S1512e); and the process is completed (S1520).

The configuration of example 7 of the present invention described above may use the cost-determined responsibility changing program 2261 to allocate the remote copy group 306 and the JVOL 303, the remote copy group 406 and the JVOL 403, the remote copy group 406 and the SVOL 401, 402, and the remote copy group 306 and the PVOL 301 to the same MPPK and can prevent the changing if the destination MPPK 210 is under a higher cost in each case in the remote copy function as is the case with the local copy function in example 5 and the extended volume function in example 6.

EXAMPLE 8

Example 8 of the preset invention will then be described with reference to FIG. 37. FIG. 37 depicts an example of a process flow of the cost-determined responsibility changing program 2261 in example 8 of the preset invention.

FIG. 37 includes a cascade destination acquisition steps S310a and S310b executed if it is determined that the cost on the PVOL side is smaller than the threshold value (S302, No) and if it is determined that the responsible MPPK 210 on the PVOL side may be changed (S305, Yes) unlike FIG. 25. At the cascade destination acquisition steps S310a and S310b, the processor 211 of the MPPK 210 checks whether the changing object PVOL or SVOL of the responsible MPPK 210 has cascade setting. The cascade setting means that the volume 250 functioning as PVOL or SVOL of a certain pair is also the volume 250 making up another pair.

In the cascade destination acquisition step S310a or S310b, the processor 211 refers to the volume attribute field 22112 of the volume table 2211 to determine whether the changing object PVOL or SVOL is subjected to the cascade setting, i.e., used as the volume of another pair. If the cascade setting exists, the processor 211 specifies all the cascaded volumes 250 for changing the responsible MPPK 210 (S320, S321).

In example 8 described above, if the changing object volume 250 of the responsible MPPK 210 is set as a pair of another function, the responsible MPPK 210 for the partner volume 50 included in the pair is changed together and, therefore, the communication between the MPPKs 210 can be avoided that is generated when the responsible MPPKs 210 for the volumes 250 making up a pair are different.

EXAMPLE 9

Example 9 of the preset invention will then be described with reference to FIG. 38. FIG. 38 depicts an example of a process flow of the cost-determined responsibility changing program 2261 in example 9 of the preset invention. FIG. 38 has determination steps S311a and S311b following the cascade destination acquisition steps S310a and S310b, respectively, unlike FIG. 37. If it is determined at the determination steps S311a and S311b that the changing object SVOL of the responsible MPPK 210 is subjected to the cascade setting (S311a or S311b, Yes), the cost-determined responsibility changing program 2261 simple completes the process.

In example 9 described above, if it is determined that another function is set for the changing object volume 250 of the responsible MPPK 210, the effect of changing the responsible MPPKs 210 for the volumes 250 making up a pair can be avoided.

EXAMPLE 10

Example 10 of the preset invention will then be described with reference to FIGS. 39 and 40. FIG. 39 depicts an example of the responsibility changing threshold table 2251 in this example.

The responsibility changing threshold table 2251 in this example shown in FIG. 39 records a maximum movable VOL number value 22514 and a weight 22515 for each of the function types 22511 of the storage functions unlike the case of FIG. 22. The maximum movable VOL number value 22514 is a value indicative of up to how many volumes 250 may be changed their responsible MPPKs 210 for each of the storage function types set to the volume 2250 if the responsible MPPK 210 for the volume 250 is changed in the case of the cascade setting when a plurality of the storage functions is set to one volume 250 in an overlapped manner.

The weight 22515 is a reference value when selecting the responsible MPPK 210 for the volumes 250 making up a pair and indicates a degree of the communication overhead when the responsible MPPKs 210 are different in a pair of each function. The example of FIG. 39 represents that a pair of the remote copy function generates the communication overhead 2.5 times greater than that of a pair of the local copy function.

FIG. 40 depicts an example of a process flow of the cost-determined responsibility changing program 2261 in example 10 of the preset invention. The process flow of FIG. 40 includes processes of S312a or S312b, S313a or S313b, and S314a and S314b if it is determined that a cascade destination exists at S311a or S311b unlike the case of FIG. 38.

At S311a or S311b, the cost-determined responsibility changing program 2261 determines whether the changing object SVOL of the responsible MPPK 210 is subjected to the cascade setting and, if it is determined that the SVOL is subjected to the cascade setting (S311a or S311b, Yes), the cost-determined responsibility changing program 2261 lists and compares the function type patterns of the volume 250 having the responsible MPPK 210 to be changed in the pair (S312 or S312b) with the maximum movable VOL number values 22514 of the responsibility changing threshold table 2251 to determined whether any function type pattern has the number of volumes 250 to be changed not exceeding the maximum movable VOL number values 22514 (S313a or S313b). If it is determined that no corresponding function type pattern exists (S313a or S313b, No), the process is simply completed.

If it is determined that the corresponding function type pattern exists (S313a or S313b, Yes), the cost-determined responsibility changing program 2261 acquires all the weights 22515 cascaded to the changing object SVOL from the responsibility changing threshold table 2251 to select a pair having the smallest total weight 22515 (S314a or S314b).

With the configuration of example 10 described above, if the changing object volume 250 of the responsible MPPK 210 makes a pair of another function, the communication overhead may be constrained that is generated because another MPPK 210 is responsible for the paired volumes 250 and the effect of changing the responsible MPPK 210 may be constrained within a predetermined range.

In conclusion, according to the embodiment of the present invention, a responsible MPPK of a volume is changed in consideration of the storage function setting status for the volume. A resource having the responsible MPPK to be changed and the MPPK after the changing are determined in consideration of the processing cost of the storage function. Therefore, performance can be prevented from deteriorating due to the changing of the responsible MPPK for the volume applied with the storage function. As compared to the case of not considering the storage function, the load can be equalized between MPPKs. Therefore, the usage rate of MPPK can be improved.

Although the present invention has been described in terms of the examples thereof with reference to the accompanying drawings, the present invention is not limited to these examples. All modifications and equivalents not departing from the spirit of the present invention fall within the range of the present invention.

The invention claimed is:

1. A storage system having a storage device that includes a storage medium providing a plurality of unit logical storage areas used as data storage areas of an external apparatus and a plurality of processing devices communicatively coupled to the storage device to execute data IO processes for the unit logical storage areas from the external apparatus, the storage system comprising:
 a responsible processing device retaining unit that retains the unit logical storage areas and the processing devices executing the data IO processes of the unit logical storage areas in a correlated manner;
 a storage function retaining unit that retains the unit logical storage areas and storage function information that is information set for the unit logical storage areas to indicate usage aspects of the unit logical storage areas in a correlated manner; and
 a processing device changing unit that acquires from the responsible processing device retaining unit the processing device correlated with each of the logical storage areas based on the storage function set for the unit logical storage areas acquired from the storage function retaining unit for the unit logical storage areas to determine whether a change of the responsible processing device is necessary, the processing device changing unit changing the processing device correlated with the logical storage area to different one of the processing devices if it is determined that the change is necessary.

2. The storage system of claim 1, wherein
 the storage device provides to the external apparatus a logical volume as the unit logical storage area generated from a RAID group made up of a plurality of disk devices, wherein
 the responsible processing device retaining unit is a responsible processing device table that retains a volume number that is an identification code for identifying the logical volumes and a responsible processing device number that is an identification code for identifying the processing device executing the data IO process of the logical volume in a correlated manner, wherein
 the storage function retaining unit is a logical volume table that retains the logical volume numbers and function information that is information indicative of the storage function set for the logical volume, and wherein
 the processing device changing unit is a processing unit changing unit that updates the responsible processing device table for changing the processing device correlated with the unit logical storage area.

3. The storage system of claim 1, wherein
 when setting in the unit logical storage areas a copy function of copying data stored in the unit logical storage area to different one of the unit logical storage areas and when it is determined whether the processing device responsible for the unit logical storage area is different from the processing device responsible for the different unit logical storage area, if determined to be different, the processing device changing unit updates the responsible processing device retaining unit such that the same processing device becomes responsible for the unit logical storage areas if determined to be different.

4. The storage system of claim 3, wherein
 when the copy function is set in the unit logical storage areas and a process of synchronizing stored data in the unit logical storage areas is executed and when it is determined whether the processing device responsible for the unit logical storage area is different from the processing device responsible for the different one of the unit logical storage areas, if determined to be different, the processing device changing unit updates the responsible processing device retaining unit such that the same processing device becomes responsible for the unit logical storage areas.

5. The storage system of claim 4, wherein
 when setting the copy function in the unit logical storage areas and when the copy function is set in the unit logical storage areas and a process of synchronizing stored data in the unit logical storage areas is executed, the processing device changing unit is set so as not to accept a manual changing operation that is an operation for forcibly and externally changing the processing device responsible for the unit logical storage area.

6. The storage system of claim 3, further comprising
 a cost threshold retaining unit that retains a threshold value of cost allowable for the responsible processing device for at least one of the copy source unit logical storage areas or the copy destination unit logical storage areas among the unit logical storage areas with the local copy function set, and
 a processor usage rate retaining unit that acquires the processing devices and the usage rates of processors included in the processing devices for executing the data IO processes to retain and correlate the usage rates with the processing devices, wherein
 when the local copy function is set in the unit logical storage areas and a process of synchronizing stored data in the unit logical storage areas is executed, if it is determined that the processing device responsible for the unit logical storage area is different from the processing device responsible for the different one of the unit logical storage area and the processing devices are changed such that the same processing device becomes responsible for the unit logical storage areas, the processing device changing unit acquires the processor usage rate of the processing device after the change from the processor usage rate retaining unit to update the responsible processing device retaining unit if it is determined that the processor usage rate does not exceed the cost threshold value.

7. The storage system of claim 1, wherein
when an extended storage area function is set for the unit logical storage areas providing to the external apparatus an extended storage area that is one logical storage area created by a plurality of the unit logical storage areas, if it is determined that the unit logical storage areas are unit logical storage areas providing the extended storage area and it is determined that the same processing device is not responsible for the unit logical storage areas making up the extended storage area, the processing device changing unit changes the processing device correlated with the logical storage area to the different one of the processing device.

8. The storage system of claim 1, wherein
when, in the unit logical storage areas, a remote copy function is set that is made up of a primary storage area normally processing data IO of the external apparatus, a secondary storage area to which stored data of the primary storage area at a certain time point is copied, and a temporary storage area that temporarily stores data copied from the primary storage area to the secondary storage area, and when the unit logical storage area belongs to a remote copy group made up of the secondary storage area and the temporary storage area, if it is determined that the same processing device is not responsible for the secondary storage area, the temporary storage area, and the remote copy group, the processing device changing unit changes the processing device correlated with the respective unit logical storage areas to the different one of the processing devices.

9. The storage system of claim 6, wherein
for the unit logical storage areas with the copy function set, the cost threshold retaining unit retains a change allowable area number that is a maximum value of the number of the unit logical storage areas allowed to change the responsible processing device at one time and a communication cost weight that is an index representative of a weight of cost of communications performed between the processing devices when different processing devices are responsible for the unit logical storage areas with the copy function set, and wherein
when a plurality of the copy functions is set in the unit logical storage areas and it is determined that the processing device responsible for the unit logical storage area is different from the processing device responsible for different one of the unit logical storage areas, the processing device changing unit updates the responsible processing device retaining unit to change the processing devices such that the same processing device becomes responsible for the unit logical storage areas that are the unit logical storage areas making up a combination having the smallest communication cost weight within the change allowable area number.

10. A processing efficiency improving method of a storage system having a storage device that includes a storage medium providing a plurality of unit logical storage areas used as data storage areas of an external apparatus and a plurality of processing devices communicatively coupled to the storage device to execute data IO processes for the unit logical storage areas from the external apparatus, the method comprising:
retaining in a responsible processing device retaining unit the unit logical storage areas and the processing devices executing the data IO processes of the unit logical storage areas in a correlated manner;
retaining in a storage function retaining unit the unit logical storage areas and storage function information that is information set for the unit logical storage areas to indicate usage aspects of the unit logical storage areas in a correlated manner;
acquiring the processing device correlated with each of the logical storage areas from the responsible processing device retaining unit based on the storage function set for the unit logical storage areas acquired from the storage function retaining unit for the unit logical storage areas;
determining whether a change of the responsible processing device is necessary; and
changing the processing device correlated with the logical storage area to different one of the processing devices if it is determined that the change is necessary.

11. The processing efficiency improving method of the storage system of claim 10, wherein
when setting in the unit logical storage areas a copy function of copying data stored in the unit logical storage area to different one of the unit logical storage areas and when it is determined whether the processing device responsible for the unit logical storage area is different from the processing device responsible for the different one of the unit logical storage areas, if determined to be different, the responsible processing device retaining unit is updated such that the same processing device becomes responsible for the unit logical storage areas.

12. The processing efficiency improving method of the storage system of claim 11, wherein
when the copy function is set in the unit logical storage areas and a process of synchronizing stored data in the unit logical storage areas is executed and when it is determined whether the processing device responsible for the unit logical storage area is different from the processing device responsible for the different one of the unit logical storage areas, if determined to be different, the responsible processing device retaining unit is updated such that the same processing device becomes responsible for the unit logical storage areas.

13. The processing efficiency improving method of the storage system of claim 12, further comprising
retaining in a cost threshold retaining unit a threshold value of cost allowable for the responsible processing device for at least one of the copy source unit logical storage areas or the copy destination unit logical storage areas among the unit logical storage areas with the copy function set;
acquiring by a processor usage rate retaining unit the processing devices and the usage rates of processors included in the processing devices for executing the data IO processes and retaining therein with correlating the usage rates with the processing devices, wherein when the local copy function is set in the unit logical storage areas and a process of synchronizing stored data in the unit logical storage areas is executed, if it is determines that the processing device responsible for the unit logical storage area is different from the processing device responsible for different one of the unit logical storage areas and the processing devices are changed such that the same processing device becomes responsible for the unit logical storage areas, the processing device changing unit acquires the processor usage rate of the processing device after the change from the processor usage rate retaining unit to update the responsible processing device retaining unit if it is determined that the processor usage rate does not exceed the cost threshold value.

14. The processing efficiency improving method of the storage system of claim 10, wherein when an extended storage area function is set for the unit logical storage areas providing to the external apparatus an extended storage area that is one logical storage area created by a plurality of the unit logical areas, if it is determined that the unit logical storage areas are unit logical storage areas providing the extended storage area and it is determined that the same processing device is not responsible for the unit logical storage areas making up the extended storage area, the processing device correlated with the logical storage area is changed to the different one of the processing devices.

15. The processing efficiency improving method of the storage system of claim 13, wherein for the unit logical storage areas with the copy function set, the cost threshold retaining unit retains a change allowable area number that is a maximum value of the number of the unit logical storage areas allowed to change the responsible processing device at one time and a communication cost weight that is an index representative of a weight of cost of communications performed between the processing devices when different processing devices are responsible for the unit logical storage areas with the copy function set, and wherein when a plurality of the copy functions are set in the unit logical storage areas and it is determined that the processing device responsible for the unit logical storage area is different from the processing device responsible for the different one of the unit logical storage areas, the processing device changing unit updates the responsible processing device retaining unit to change the processing devices such that the same processing device becomes responsible for the unit logical storage areas that are the unit logical storage areas making up a combination having the smallest communication cost weight within the change allowable area number.

* * * * *